US012552064B2

(12) United States Patent
Nelson et al.

(10) Patent No.: US 12,552,064 B2
(45) Date of Patent: Feb. 17, 2026

(54) DEVICE FOR PRODUCING SLIT SHEET PACKING MATERIAL

(71) Applicant: ENCORE PACKAGING LLC, Lake Villa, IL (US)

(72) Inventors: Timothy H. Nelson, Winnetka, IL (US); Oliver Harris, Grayslake, IL (US); Duncan Hughes, Green Oaks, IL (US)

(73) Assignee: ENCORE PACKAGING LLC, Lake Villa, IL (US)

( * ) Notice: Subject to any disclaimer, the term of this patent is extended or adjusted under 35 U.S.C. 154(b) by 123 days.

(21) Appl. No.: 18/692,718

(22) PCT Filed: Sep. 16, 2022

(86) PCT No.: PCT/US2022/043888
§ 371 (c)(1),
(2) Date: Mar. 15, 2024

(87) PCT Pub. No.: WO2023/044062
PCT Pub. Date: Mar. 23, 2023

(65) Prior Publication Data
US 2024/0367334 A1 Nov. 7, 2024

Related U.S. Application Data

(60) Provisional application No. 63/245,500, filed on Sep. 17, 2021.

(51) Int. Cl.
*B26D 9/00* (2006.01)
*B26D 1/00* (2006.01)
(Continued)

(52) U.S. Cl.
CPC ............. *B26D 9/00* (2013.01); *B26D 1/0006* (2013.01); *B26D 1/185* (2013.01); *B26F 1/20* (2013.01);
(Continued)

(58) Field of Classification Search
CPC ........ B26D 9/00; B26D 1/0006; B26D 1/185; B26D 2001/0033; B26D 2001/0053; B26F 1/20
See application file for complete search history.

(56) References Cited

U.S. PATENT DOCUMENTS 2,002,346 A * 5/1935 Goodwillie ............. C03B 21/02 83/318
3,748,934 A 7/1973 Lezberg
(Continued)

FOREIGN PATENT DOCUMENTS

TW 202134042 A 9/2021
WO 2018/045316 A1 3/2018
(Continued)

OTHER PUBLICATIONS

International Search Report in corresponding application PCT/US2022/043888, mailed Jan. 3, 2023; 2 pages.
(Continued)

*Primary Examiner* — Omar Flores Sanchez
(74) *Attorney, Agent, or Firm* — Fitch, Even, Tabin & Flannery LLP

(57) ABSTRACT

A device for producing various types of cut, slit, or scored packing material includes a housing having an entry opening for receiving packing material, an internal chamber including a movable carriage having one or more rotary blades, and an exit opening. A controller of the device is operably coupled to a motor for moving the carriage between a first position and a second position within the internal chamber
(Continued)

as packing material is advanced therethrough. In response to receiving a user input at a user interface operably coupled to the controller, the controller is configured to cause the motor to facilitate movement of the carriage between the first and second positions such that a rotary blade thereof may engage with and cut, slit, or score the packing material as the material is advanced through the device.

13 Claims, 21 Drawing Sheets

(51) Int. Cl.
*B26D 1/18* (2006.01)
*B26F 1/20* (2006.01)

(52) U.S. Cl.
CPC ................ *B26D 2001/0033* (2013.01); *B26D 2001/0053* (2013.01)

(56) References Cited

U.S. PATENT DOCUMENTS

| | | | | | |
|---|---|---|---|---|---|
| 3,776,072 | A | 12/1973 | Gerber et al. | | |
| 4,089,090 | A | 5/1978 | Westberg | | |
| 5,056,729 | A * | 10/1991 | Spehar | B26D 9/00 | 83/649 |
| 5,171,386 | A * | 12/1992 | Schiavone, Jr. | B26D 9/00 | 156/511 |
| 5,907,984 | A * | 6/1999 | Herman, Jr. | B26D 11/00 | 83/100 |
| 10,549,558 | B2 * | 2/2020 | Masuda | B26D 5/08 | |
| 2004/0099116 | A1 | 5/2004 | Stein | | |
| 2006/0096435 | A1 * | 5/2006 | Stein | B26F 1/12 | 83/651 |
| 2011/0283855 | A1 * | 11/2011 | Kwarta | B26D 7/2635 | 83/499 |
| 2014/0116215 | A1 * | 5/2014 | Kwarta | B26F 1/20 | 83/76.1 |
| 2014/0116218 | A1 * | 5/2014 | Kwarta | B26D 7/2635 | 83/562 |
| 2018/0079097 | A1 * | 3/2018 | Oiwa | B26D 7/2635 | |
| 2020/0353635 | A1 * | 11/2020 | Urrutia Nebreda | B26D 1/245 | |
| 2021/0053373 | A1 * | 2/2021 | Mindler | B41J 29/393 | |
| 2021/0300084 | A1 * | 9/2021 | Takahashi | B65H 35/0086 | |
| 2021/0379912 | A1 * | 12/2021 | Ruiz Martinez | B26D 1/185 | |
| 2022/0340316 | A1 * | 10/2022 | Gillespie | B65B 9/067 | |

FOREIGN PATENT DOCUMENTS

| | | | |
|---|---|---|---|
| WO | 2021/130613 | A1 | 7/2021 |
| WO | 2021/130660 | A1 | 7/2021 |

OTHER PUBLICATIONS

Written Opinion of the International Searching Authority in corresponding application PCT/US2022/043888, mailed Jan. 3, 2023, 7 pages.

* cited by examiner

DEVICE FOR PRODUCING SLIT SHEET PACKING MATERIAL

CROSS-REFERENCE TO RELATED APPLICATION

This application is the national phase of PCT/US2022/043888 filed Sep. 16, 2022, which claims the benefit of U.S. Provisional Patent Application No. 63/245,500, filed Sep. 17, 2021, which is hereby incorporated herein by reference in its entirety.

TECHNICAL FIELD

The present disclosure relates generally to a device for producing packing material, and more specifically, to a device for producing slit sheet packing material for wrapping articles for shipping.

BACKGROUND

When shipping an article from one location to another, the article is typically placed in a container such as a box or package along with protective packing material to fill the empty voids around the article and to cushion the article during shipping. For example, some commonly used void filling packing materials include cellular foam polystyrene (e.g., STYROFOAM®), packing peanuts, crumpled paper, and bubble wrap that are used to protect and cushion the articles while in transit.

However, these commonly used void-filling materials can have certain drawbacks. For example, plastic-based materials such as packing peanuts have certain ecological disadvantages such as not being easily biodegradable when in a landfill. Although these plastic materials can be recycled through reuse, recycling programs for such packaging materials have been met with limited success. Although a wide variety of products have been designed to provide a substitute for materials such as packing peanuts, each of these products have their own disadvantages. Bubble wrap is one common alternative that consists of numerous small pockets of air bubbles within a polymer substrate. However, bubble wrap is often very bulky due to these air bubbles and can easily cause storage problems, and is further expensive and difficult to transport due to its bulk. Crumpled paper may be used in some instances but providing enough crumpled paper to be used for void-filling purposes can require a significant amount of paper and can be economically problematic as a result.

In recent years, slit sheet packing material, sometimes typified as "honeycomb" packing material due to its distinctive shape, has been used as an alternative, ecologically-friendly material that provides certain benefits over prior products. Slit sheet paper packing material typically includes a durable paper such as kraft paper with consecutive rows of alternating slits cut into the paper. Once the slits have been formed, the material may be expanded or tensioned to stretch and open the sheet of material to provide honeycomb-like openings. When stretched in this manner, the thickness of the slit sheet paper packing material can increase by an order of magnitude, or more, relative to its original thickness. This increased thickness allows the expanded material to serve as a protective cushioning wrap for articles, as it is capable of filling a greater volume of space within a box or package.

Such slit-sheet packing material has historically been manufactured offsite from a typical packaging or shipping operation, and manufacturers of such material supply it as a continuous roll of pre-slit paper, which can then be expanded by the individuals using such material for packaging. These rolls of slit sheet material, however, may only be sold in specific sizes that may not be tailored to a variety of different packaging applications (e.g., packages of different sizes such that different widths of slit sheet packing material may be desired). As a result, it is not currently feasible for a company involved in packaging or shipping to easily obtain made-to-use custom sized slit sheet packing material for desired applications. In addition, the cutting mechanisms present in prior devices for forming slit sheet packing material are limited as only being able to cut certain materials, such as kraft paper, and do not provide users with options for forming different patterns as needed for different applications. Finally, such devices have historically been too large and bulky for a company involved in packaging to operate themselves; thus, the only option such companies have is to buy large rolls of pre-manufactured slit sheet packing material of a variety of different sizes as needed.

Figure 1:
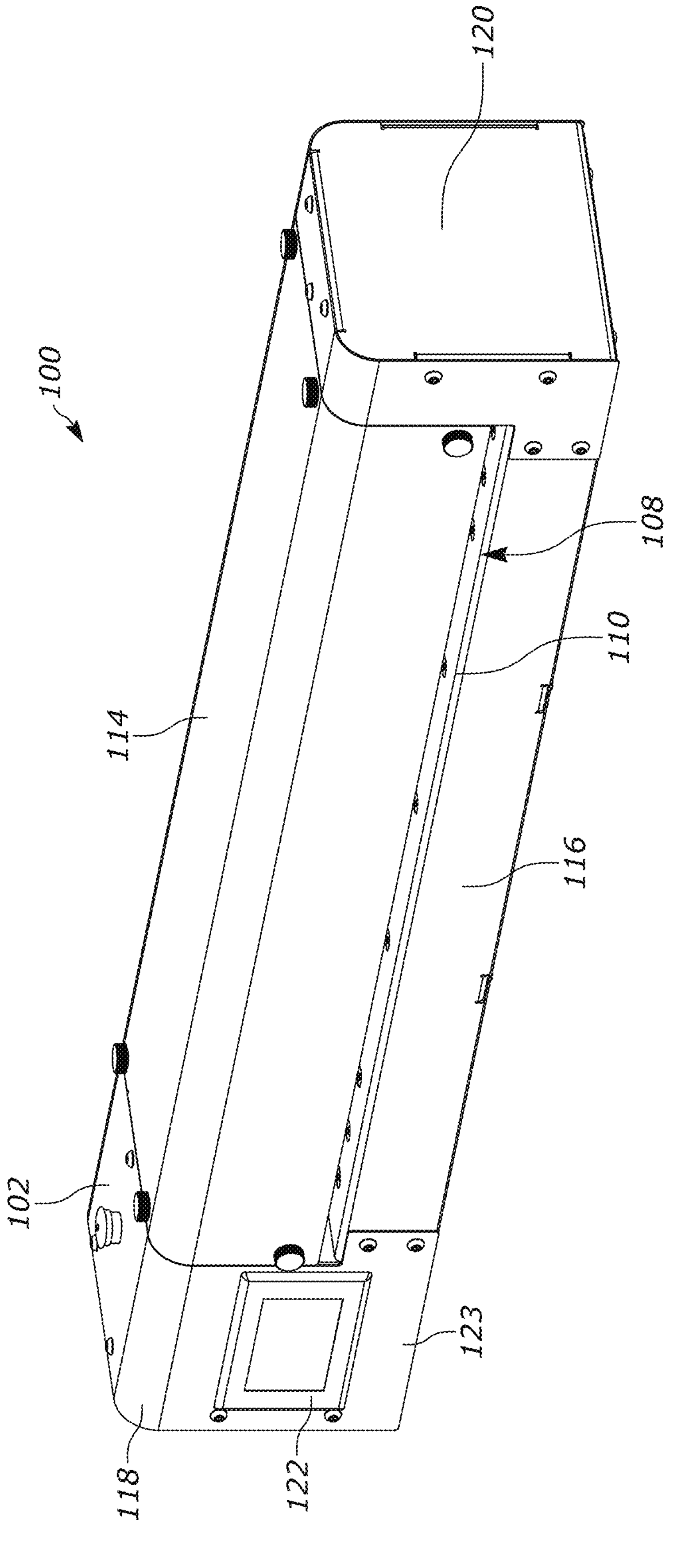
FIG. 1 is a perspective view of an example device for producing slit sheet packing material having a housing, a user interface positioned on the housing, and an exit slot.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted to facilitate a less obstructed view of the various embodiments. It will further be appreciated that certain actions and/or steps may be described or depicted in a particular order of occurrence while those skilled in the art will understand that such specificity with respect to sequence is not actually required.

DETAILED DESCRIPTION

Generally, in accordance with one aspect of the present disclosure, a device for producing various types of cut, slit, or scored packing material includes a housing having an entry opening for receiving a length of packing material, an internal chamber including a movable carriage having one or more rotary blades, and an exit opening. The packing material is advanced through the internal chamber in a machine direction, and a controller of the device is operably coupled to a motor for moving the carriage between a first position and a second position within the internal chamber transverse to the machine direction as the material is advanced therethrough. In response to receiving a user input at a user interface operably coupled to the controller, the controller is configured to cause the motor to facilitate movement of the carriage between the first and second positions such that the rotary blades thereof may engage with and cut and/or slit the packing material to produce various patterns of cuts, slits, or scores in the material as the material is advanced through the device.

In some embodiments, the carriage may include a plurality of rotary blades such as a first rotary blade and a second rotary blade. The first and second rotary blades may each have notches positioned about a circumference thereof to facilitate the cutting of slits in the material as the carriage moves between the first and second positions. The notches in each of the rotary blades may be of a same size or a different size such that the device may be configured to cut slits in the packing material having variable lengths. In one example, the rotary blades may be coaxial, and the notches of the rotary blades may be circumferentially offset from one another. So configured, adjacent rows of slits cut in the packing material transverse to the machine direction may be offset from one another and the resulting slit-sheet material may subsequently be expanded into a honey-comb like structure for use in packaging applications. By varying the type of rotary blades, the number of the rotary blades, the notches cut therein, and the configuration thereof, a user may be permitted to cut, slit, or score a variety of patterns in the material as it is advanced through the device.

In one aspect, the carriage, including the one or more rotary blades, is mounted on and configured to move along a track between the first and second positions in the housing. In some forms, the carriage may include one or more guide apertures that receive respective support rails of the track such that the carriage is slidable therealong. In addition, the carriage may include a drive bore having an internally threaded bushing that is configured to engage with a threaded, rotatable driveshaft. In some embodiments, the motor may be coupled to and configured to rotate the threaded driveshaft in a clockwise or counter-clockwise direction so as to engage the threads of the bushing and cause the carriage to advance between the first and second positions along the track during a cutting operation.

The device may additionally include one or more powered drive rollers positioned proximate the entry opening that are configured to advance the packing material through the internal chamber from the entry opening to the exit opening. In some forms, the drive rollers may be at least partially contained within a lower portion of the housing such that only a portion extends into the internal chamber. The drive rollers may be powered by another motor that is operably coupled to the controller and may be operated intermittently to permit the carriage to cut, score, or slit a portion of the material before feeding additional packing material through the internal chamber.

In addition, one or more support rollers may be provided proximate the drive rollers that are configured to impinge upon the packing material so as to sandwich the material against the drive rollers. In some forms, the one or more support rollers may be pivoted between a disengagement position used for loading the packing material and an engagement position for engaging with and assisting in the feeding of the packing material through the internal chamber. The one or more support rollers may be pivoted between the engagement and disengagement positions using, for example, one or more linear actuators that are operatively coupled to the controller and/or the user interface.

Figure 2:
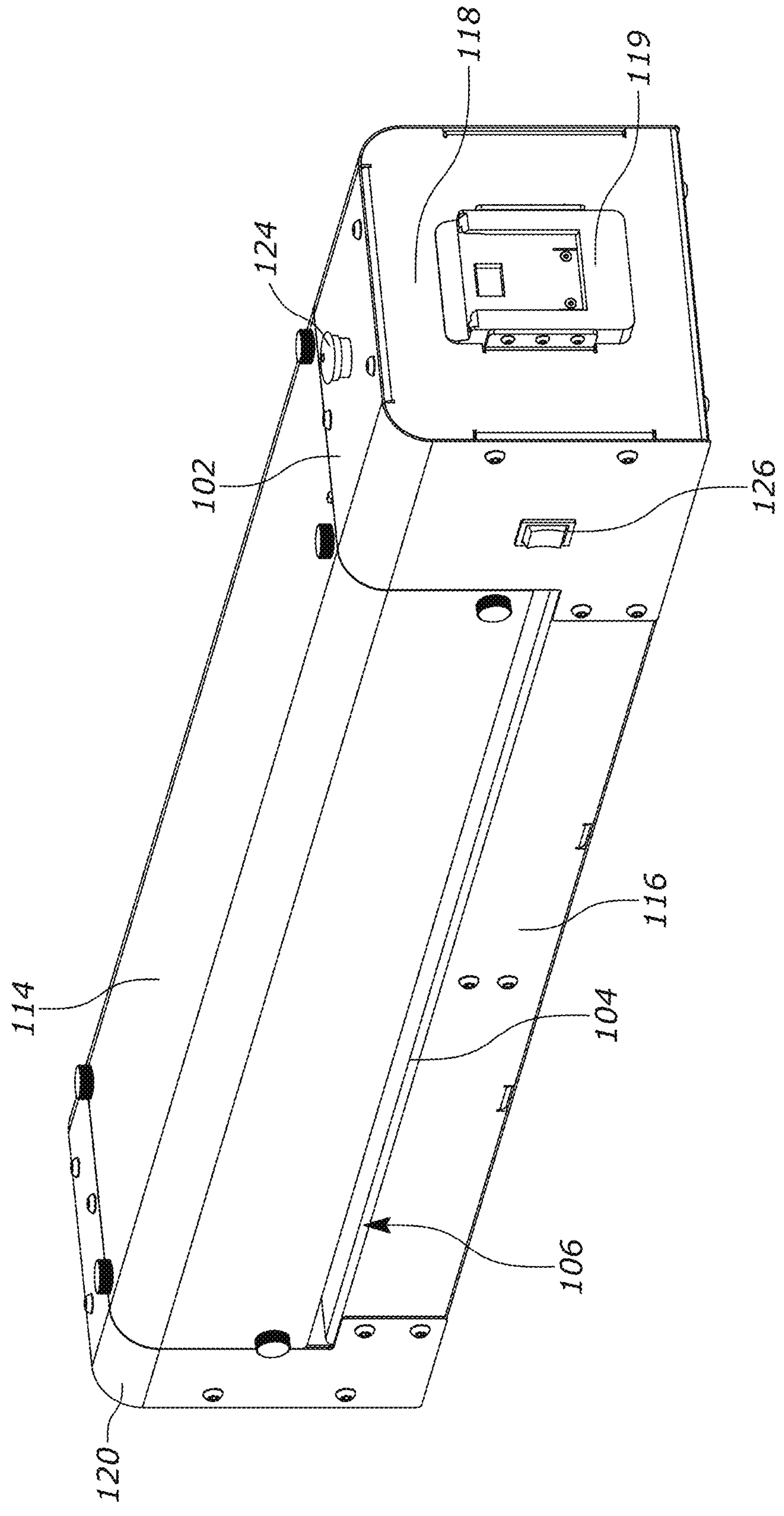
FIG. 2 is a rear perspective view of the example device shown in FIG. 1 showing an entry slot of the housing.

Referring now to the drawings, and more particularly FIGS. 1 and 2, a device 100 for cutting, slitting, and/or scoring packing material is provided including a housing 102 having an entry opening 104 in the form of an elongate slot 106 for receiving a portion of packing material and an exit opening 108 in the form of an elongate slot 110. As described in further detail herein, a portion of packing material such as a loose end thereof may be advanced into the entry opening 104, the packing material may be cut, slit, or scored within an internal chamber 112 (shown in FIGS. 3 and 4) via one or more rotary blades, and the cut, slit, or scored material may then exit the exit opening 108 for use in packaging various objects for shipping. It should be understood that packing materials of a variety of thicknesses and widths may be configured to fit in the entry opening 104 and advanced through the device 100 such that a user may select a specific material having specific dimensions for use in accordance with a desired packaging application to be cut, slit, or scored in the manner provided herein.

As shown, the housing 102 may include various sub-portions including a cover 114 extending over and covering the components within internal chamber 112, a lower portion 116 extending at least partially below the internal chamber 112, and lateral portions 118, 120. Although the housing 102 is illustrated as including these various sub portions, it should be understood that the housing 102 may alternatively be formed in other variations including more or fewer sub-portions. A user interface 122 may be positioned on an outer surface 123 of the housing 102, such as on the lateral portion 118, for receiving user inputs to cause a controller 117 (FIG. 18) to control various aspects of the device 100. A circuit box 119 may also be positioned on the housing 102, such as on lateral portion 118, or may alternatively be positioned at least partially inside of the lateral portion 118. In some embodiments, the user interface 122 may be formed as a digital touch screen or may additionally or alternatively include one or more analog buttons. For example, the user interface 122 may include an emergency stop button 124 shown extending from the lateral portion 118 of the housing 102 and a loading button 126 used for engaging and disengaging a support roller 128 (shown in FIGS. 3 and 4). In still other embodiments, a separate device may be communicatively coupled to the controller 117, such as a mobile phone of a user, so as to wirelessly control the device 100 in a known manner via an application or other interface.

Figure 3:
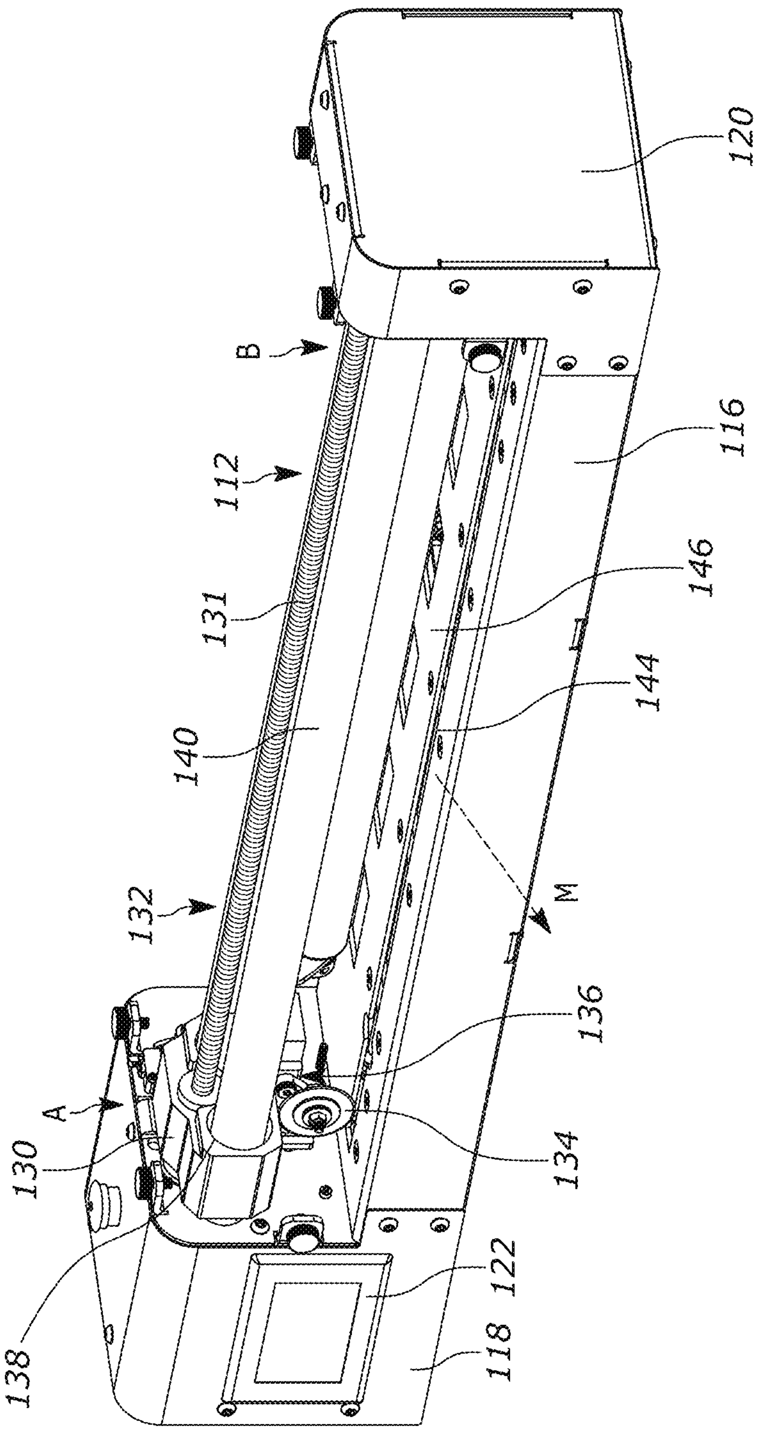
FIG. 3 is a perspective view of the example device of FIG. 1 with a cover thereof removed and showing a carriage including a rotary blade, the carriage being slidably mounted on a track.
Figure 4:
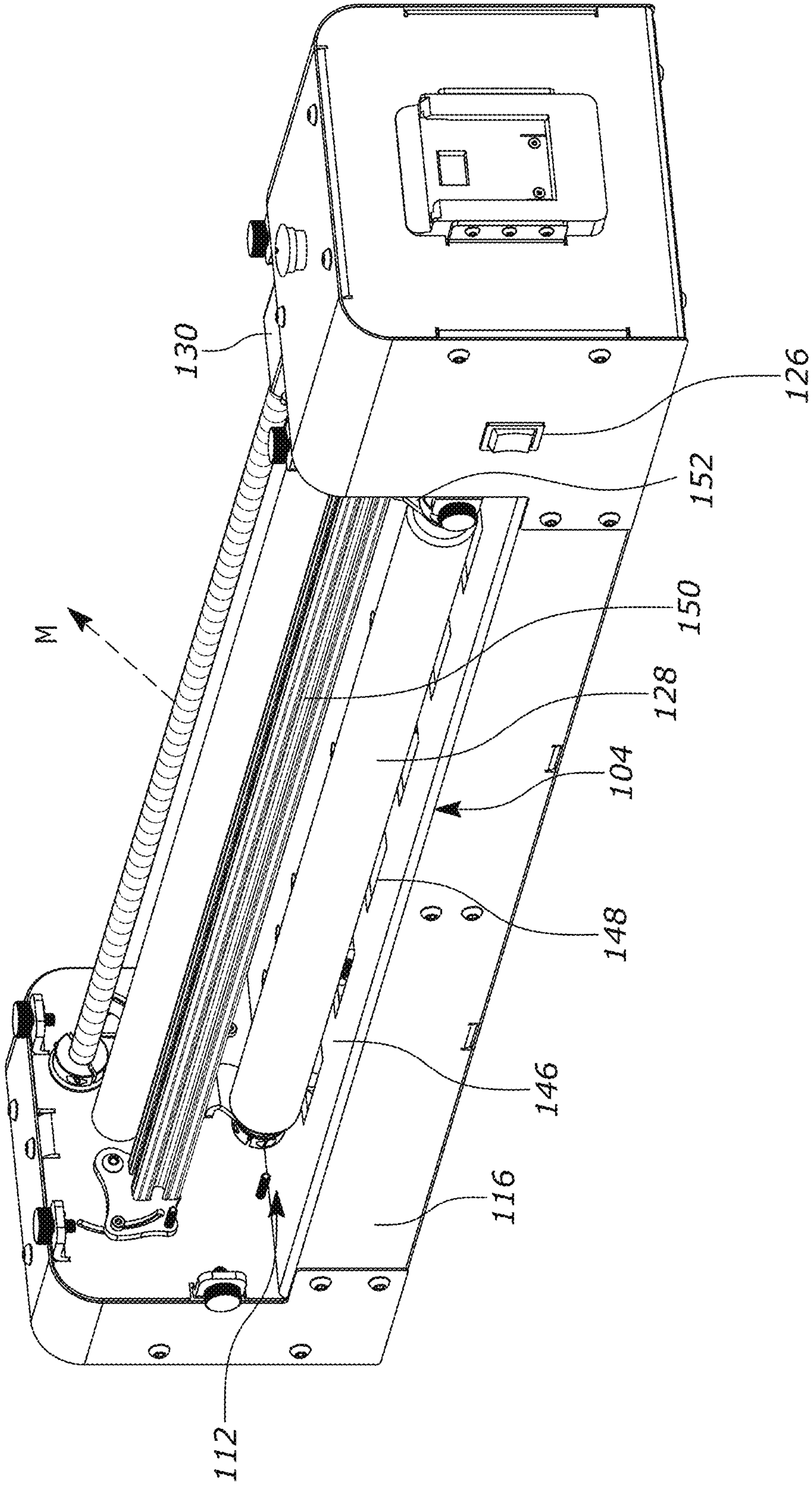
FIG. 4 is a perspective view of the rear side of the example device shown in FIG. 1 with the cover removed and showing a support roller and a plurality of drive rollers for feeding a sheet of packing material through the device.

As shown in FIGS. 3 and 4, the cover 114 of the housing 102 is removed and components within the internal chamber 112 are shown in further detail. As illustrated, a carriage 130 is mounted on and configured to move along a track 132 between lateral ends of the internal chamber 112. The carriage 130 includes one or more rotary blades 134 coupled to a lower mount 136 of the carriage for use in cutting, slitting, or score packing material being advanced through the internal chamber 112. In some embodiments, the rotary blades 134 may be configured to cut, slit, or score a variety of different packing materials such as paper, foam, bubble wrap, single-faced corrugated, double-faced corrugated, among others. The carriage 130 further includes one or more guide apertures 138 that receive and slidably engage with support rails 140 of the track 132. In some forms, an elongated annular bushing 1139 (shown in FIG. 10) may be positioned within the guide apertures 138 of the carriage 130 so as to provide a close sliding engagement therebetween. In one aspect, the carriage 130 is mounted to a threaded driveshaft 131 for moving the carriage 130 as described in further detail below.

A cutting plate 144 may be formed in or mounted on a guide surface 146 of the lower portion 116 of the housing 102 at least partially below and in a cutting path of the rotary blade 134 such that the rotary blade 134 at least partially engages the cutting plate 144 during a cutting operation. The cutting plate 144 is preferably formed of a hardened material, and in some forms, may have a differing surface area (e.g., a different width) to accommodate carriages having more or less rotary blades coupled thereto. In some forms, different cutting plates 144 of different materials or sizes may be interchangeable such that a user may replace or select a new cutting plate for different cutting applications. For example, if a carriage includes a larger number of rotary blades, a wider cutting plate to accommodate contact from each of the rotary blades may be selected.

Referring to FIG. 3, the carriage 130 is shown generally in a first position A proximate an end of the track 132 near the lateral portion 118 of the housing 102. During a cutting operation, the carriage 130 may be slidably advanced along the track 132 to a second position B at a generally opposite end thereof proximate the lateral portion 120 of the housing 102. In operation, the carriage 130 including the one or more rotary blades 134 may be driven by the threaded driveshaft 131 to move between the first position A and the second position B to cut, slit, or score the packing material as it is advanced through the device 100. In some embodiments, a limit switch (not shown) may be provided on each lateral sidewall 168, 198 to assist in controlling the movement of the carriage 130 between the first and second positions A, B to indicate to the controller 117 when rotation of the threaded driveshaft 131 should be reversed. In still other embodiments, the controller 117 may be configured to cause the carriage 130 to move less than an entire distance along the track 132 between position A and position B, such as if the user desires to only cut or slit less than an entire width of the packing material. The user may be presented with options for selecting the range of movement of the carriage 130 along the track 132 via the user interface 122.

Referring now to FIG. 4, the device 100 as shown further includes one or more drive rollers 148 that are positioned at least partially within the lower portion 116 of the housing 102 such that a portion of the drive rollers 148 extends at least partially superior to the guide surface 146 to engage with and feed packing material in the machine direction M towards the cutting plate 144 in the path of the carriage 130. The drive rollers 148 may be made of, for example, a rubberized or plastic material configured to frictionally engage the packing material so as to facilitate feeding of the packing material from the entry opening 104 to the exit opening 108 in the housing 102.

Figure 6:
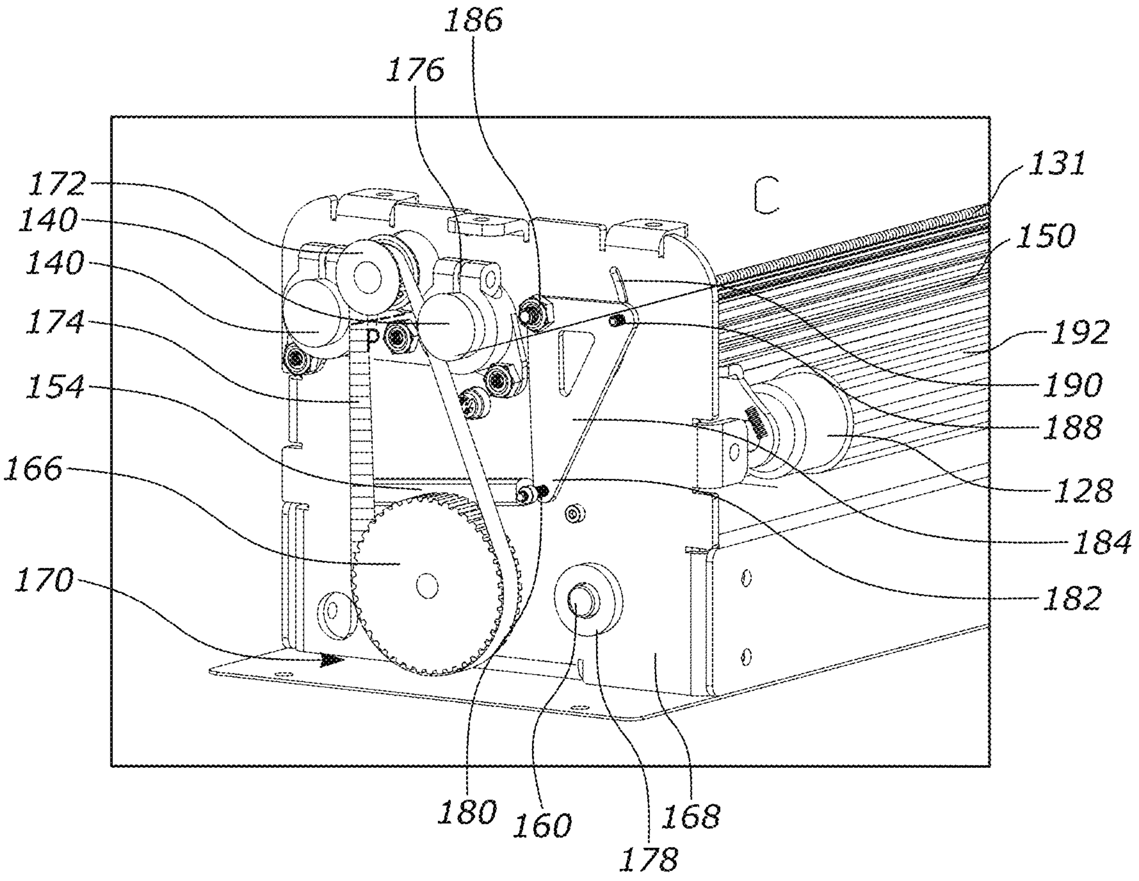
FIG. 6 is a perspective view of the device of FIG. 1 with a portion of the housing removed to show the drive mechanism for moving the carriage and a linear actuator for pivoting the support roller between an engagement position and a disengagement position.
Figure 7:
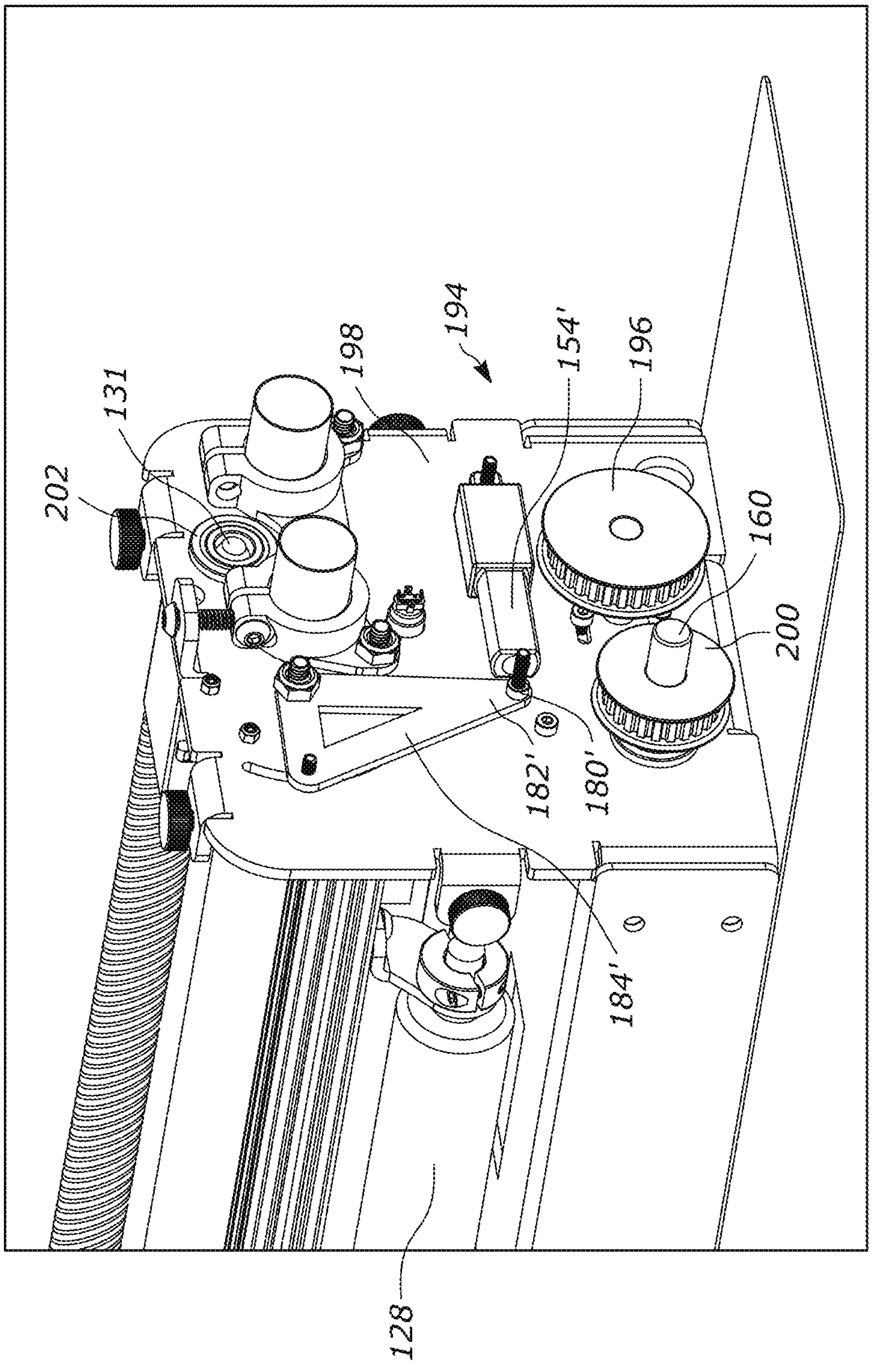
FIG. 7 is a perspective view of the device of FIG. 1 with a portion of the housing removed to show the drive mechanism for the drive rollers and a second linear actuator for pivoting the support roller between an engagement position and a disengagement position.

The support roller 128 is shown proximate the drive rollers 148 such that a length of packing material fed into the internal chamber 112 may be at least partially sandwiched therebetween. Although illustrated as an elongated cylinder, in other embodiments, the support roller 128 may include a plurality of individual support rollers. As shown, the support roller 128 is rotatably mounted to a pivoting support bar 150 via brackets 152, and the support roller 128 may be pivoted via the pivoting support bar 150 between an engagement position (shown in FIG. 4) where the support roller 128 is configured to impinge on packing material moving through the internal chamber 112 and a disengagement position (not shown) where the support roller 128 is pivoted upwards and away from the drive rollers 148 using one or more linear actuators 154 (FIGS. 6 and 7). So configured, a length of packing material may be advanced into the entry opening 104 of the housing 102 proximate the drive rollers 148 while the support roller 128 is in the disengagement position, and the support roller 128 may be moved to the engagement position to sandwich the material between the support roller 128 and the drive rollers 148 for feeding the material through the device 100. This may be accomplished using, for example, loading button 126, which may be a button or toggle for controlling the linear actuators 154 to pivot the support bar 150 and support roller 128 attached thereto between the engagement and disengagement positions. In alternative forms, control of the linear actuators 154 may be accomplished via interaction with the user interface 122.

Figure 5:
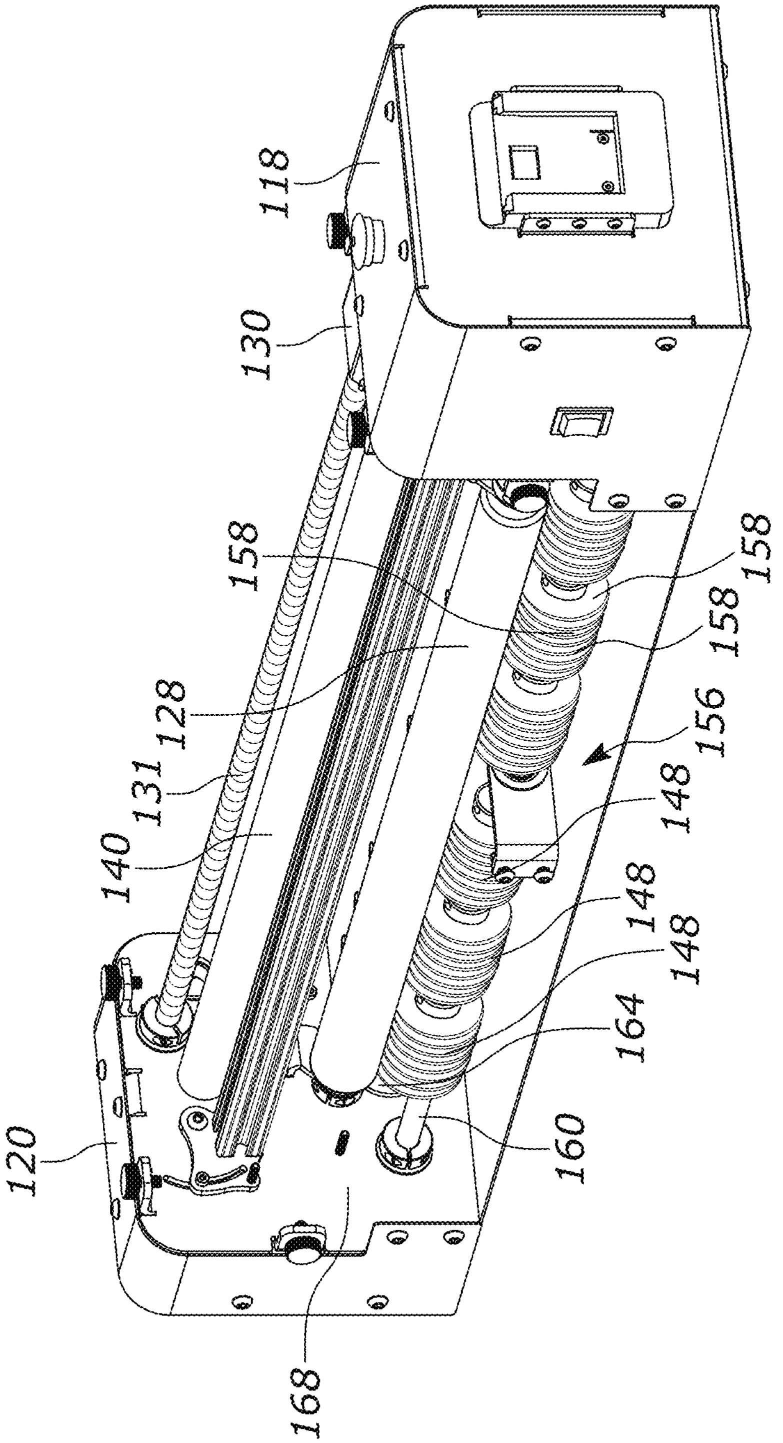
FIG. 5 is a perspective view similar to FIG. 4 with a lower portion of the housing removed to show the plurality of drive rollers.

As shown in FIG. 5, the guide surface 146 of the lower portion 116 of the housing 102 has been removed to show an internal cavity 156 of the lower portion 116. In one aspect, the one or more drive rollers 148 include a plurality of individual rollers 158 mounted on a rotating driveshaft 160. The driveshaft 160 is coupled to a motor 162 (FIG. 16) that may be positioned in, e.g., either of lateral portions 118, 120 of the housing 102. The motor 162 is operatively coupled to and configured to be controlled by the controller 117 (FIG. 16) and is configured to rotate the driveshaft 160 and drive rollers 158 to facilitate feeding of the packing material through the internal chamber 112 along the guide surface 146. In addition, another motor 164 is shown in the internal cavity 156 that is coupled to a driving gear 166 (FIG. 6) through the sidewall 168 of the lateral portion 120 and is configured to facilitate movement of the carriage 130 as described in further detail below.

FIG. 6 shows a perspective view of an internal cavity 170 within the lateral portion 120 of the housing 102 and shows a portion of the driving mechanism for moving the carriage 130. As shown, the driving gear 166 coupled to the motor 164 through the sidewall 170 is operatively coupled to a driven gear 172 via a belt 174. In other embodiments, the driving gear 166 may be coupled to the driven gear 172 in other manners, such as via direct gearing or the like. In addition, the driven gear 172 is integrally coupled to and configured to rotate the threaded driveshaft 131 on which the carriage 130 is mounted in both the clockwise and counter-clockwise directions. So configured, operation of the motor 164 is configured to cause rotation of the driving gear 166 and corresponding rotation of the driven gear 172 and threaded driveshaft 131 coupled thereto to cause the carriage 130 to advance along the track 132 within the internal chamber 112. In some embodiments, the threaded driveshaft 131 may be an 8 rotary Acme Threaded shaft. End portions of the support rails 140 are also shown within the internal cavity 170 and are inhibited from undesired movement via clamps 176. Similarly, an end portion of the driveshaft 160 is shown cradled in a bushing 178 extending through the sidewall 168 to permit the driveshaft 160 to rotate therein.

In another aspect, a linear actuator 154 is shown mounted on the sidewall 168 and includes a piston end 180 that is coupled to a lower portion 182 of a pivot bracket 184. As illustrated, the pivot bracket 184 is rotatably coupled to the sidewall 168 via a fastener 186 such as a threaded bolt such that the pivot bracket 184 is permitted to pivot around an axis of rotation P. The pivot bracket 184 further includes a fastener 188 or other coupling means extending through a slot 190 formed in the sidewall 168 that is coupled to the support bar 150. So configured, upon actuation of the linear actuator 154, the piston end 180 is configured to extend and push the lower portion 182 of the pivot bracket 184 so as to rotate the pivot bracket 184 about the axis P and cause the fastener 188 to slide within the slot 190 and pivot the support roller 128 coupled to the support bar 150 from the engagement position to the disengagement position. Upon retraction of the piston end 180, the support roller 128 may be pivoted back into the engagement position. In addition to the linear actuator 154 shown here in the lateral portion 120 of the housing 102, as shown in FIG. 7, an additional linear actuator 154' and pivot bracket 184' may be positioned in the opposite, lateral portion 118 of the housing 102 that is coupled to the opposite end of the support bar 150 in a similar manner.

In some embodiments, the support roller 128 may be made of a metal material and may include a sleeve 192 positioned therearound that is made of a plastic or rubber material for frictionally impinging upon the packing material moving through the device 100. The support roller 128 and sleeve 192 may be configured to accommodate packing materials having a variety of different thicknesses being fed through the device 100. In some forms, the sleeve 192 may include a plurality of laterally extending ridges or other contours for assisting in gripping of the packing material when feeding the packing material through the internal chamber 112. Alternatively, the support roller 128 itself may be formed of a plastic or rubber material.

FIG. 7 shows a perspective view of an internal cavity 194 within the lateral portion 118 of the housing 102. As shown, a driving mechanism for rotating the driveshaft 160 and the one or more drive rollers 148 mounted thereon includes a driving gear 196 coupled to the motor 162 (FIG. 16) on an opposite side of the sidewall 198. The driving gear 196 is coupled to a driven gear 200 via a belt (not shown, similar to belt 174), and the driven gear 200 is integrally coupled to an end of the driveshaft 160. So configured, the motor 162 may be operated by the controller 117 to rotate the driving gear 196, and correspondingly rotate the driven gear 200 to cause rotation of the driveshaft 160 and drive rollers 148 to feed the packing material through the device 100. Further, the linear actuator 154' similarly includes a piston end 180' coupled to a lower portion 182' of a pivot bracket 184' in a similar manner as the linear actuator 154 shown and described with respect to FIG. 6. A bushing 202 may also be formed in or mounted on the sidewall 198 so as to cradle the rotating end portion of the threaded driveshaft 131.

Figure 8:
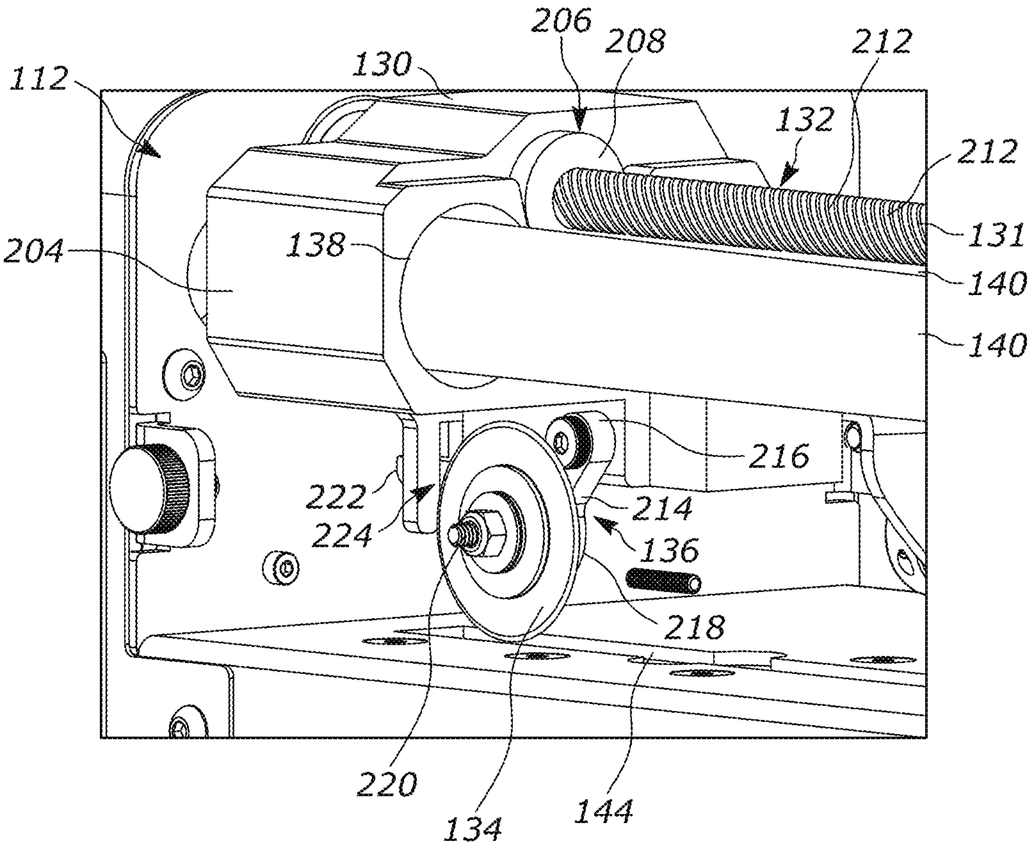
FIG. 8 is an enlarged view of FIG. 3 showing guide apertures of the carriage surrounding support rails of the track and a threaded bushing of the carriage mounted on a threaded driveshaft, the carriage including a lower mount including the rotary blade.

FIG. 8 shows an enlarged view of the carriage 130 slidably coupled to the track 132 in the internal chamber 112 of the housing 102. In particular, the guide apertures 138 of the carriage 130 are received over and slidable along the corresponding support rails 140 of the track 132. The guide apertures 138 may be formed as bores in a body 204 of the carriage 130 and may either be sized so as to closely surround the support rails 140 or may include an annular bushing (FIG. 10) so as to closely encircle and surround the support rails 140. The carriage 130 further includes a drive bore 206 including a bushing 208 having an internal thread 210 (shown in FIG. 9) that is mounted on and configured to be advanced along the threaded driveshaft 131 via rotation thereof. In the illustrated form, the bushing 208 is rigidly mounted in the drive bore 206 such that the bushing 208 is integral with the carriage 130.

Figure 9:
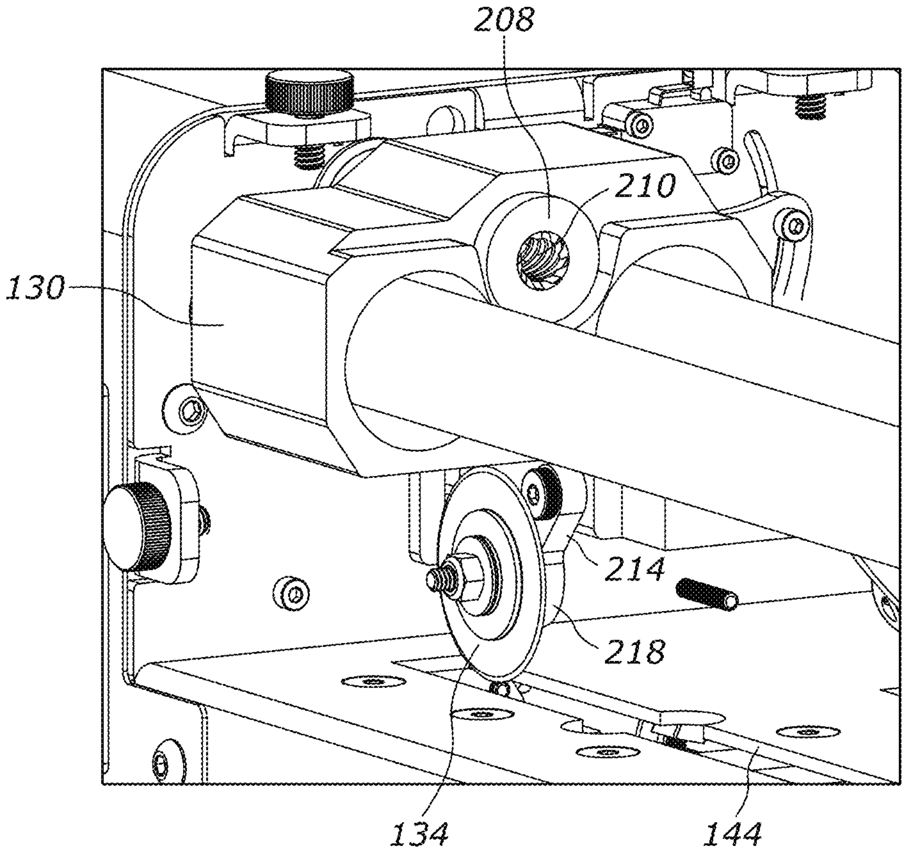
FIG. 9 is a view similar to FIG. 8 with the threaded driveshaft removed to show the internally threaded bushing of the carriage.

FIG. 9 shows another view of the carriage 130 similar to the view shown in FIG. 8, but with the threaded driveshaft 131 in ghost to show the bushing 208 having internal threading 210. As described in further detail below, upon rotation of the threaded driveshaft 131 caused by the motor 164, the threads 212 of the threaded driveshaft 131 engage with the internal threading 210 of the bushing 208 and cause the carriage 130 to move along the track 132 during a cutting operation as desired by the user.

The embodiment of the carriage 130 shown in FIGS. 8 and 9 only includes a single rotary blade 134 coupled to the lower mount 136, but in other forms, multiple rotary blades of varying configurations may be included as described below. As shown, the lower mount 136 of the carriage 130 includes an arm 214 having a first end portion 216 that is pivotably mounted to the carriage 130, a mounting portion 218 including a mount 220 for receiving one or more rotary blades 134, and a second end portion 222 that may extend at least partially in a guide slot 224 extending from the body

204 of the carriage 130. The arm 214 of the lower mount 136 may be loaded by a spring or other resilient component (not shown) such that the rotary blade 134 attached thereto is biased into engagement with the cutting plate 144. The guide slot 224, in which the second end portion 222 of the arm 214 is configured to move, is configured to inhibit undesired movement of the arm 214 in the machine direction M during a cutting operation. In still other embodiments, the lower mount 136 of the carriage 130 may include additional arms and additional rotary blades, and in some forms, differing lower mounts having differing blade configurations may be interchangeable by a user to facilitate different, desired cutting operations. For example, an example device 100 may be sold or provided with a variety of different forms of lower mounts and the user may select a desired lower mount having a specific blade configuration for a desired application.

In still other forms, the one or more rotary blade coupled to the carriage 130 need not necessarily include thin, sharp blade edges extending about the circumference thereof, and may instead include one or more blade portions configured to cut a geometric pattern in the packing material being advanced through the device 100. For example, the rotary blade may include a plurality of blade edges arranged so as to cut or slit geometric patterns, such as a triangle, circle, square, a clam shell, or other shape in the packing material in a cookie-cutter like manner. Even further, in other forms, the rotary blade need not necessarily be formed as a monolithic blade, but may be formed of a rotating member having one or more blades coupled thereto in varying configurations or at various angles. For example, such attached blades may be arranged to cut slits in the material in a direction generally transverse to the machine direction M, or may be arranged at an angle relative to the direction of rotation of the rotating member such that the slits cut in the material may be angled relative to that transverse direction. In some forms, the slits cut in the packing material may be about 45 to 75 degrees relative to the transverse direction, or in other forms may be about 60 degrees relative to the transverse direction. It should be understood that cuts or slits that are cut into the packing material adjacent one another in the direction of movement of the carriage 130 as the rotary blade advances over the packing material another need not be identical or symmetrical, and the rotary blade may be configured to cut alternating or repeating patterns as it is advanced over the packing material (e.g., slit type A, slit type B, slit type A, slit type B, etc., or, slit type A, slit type B, slit type C, slit type A, etc.).

Figure 10:
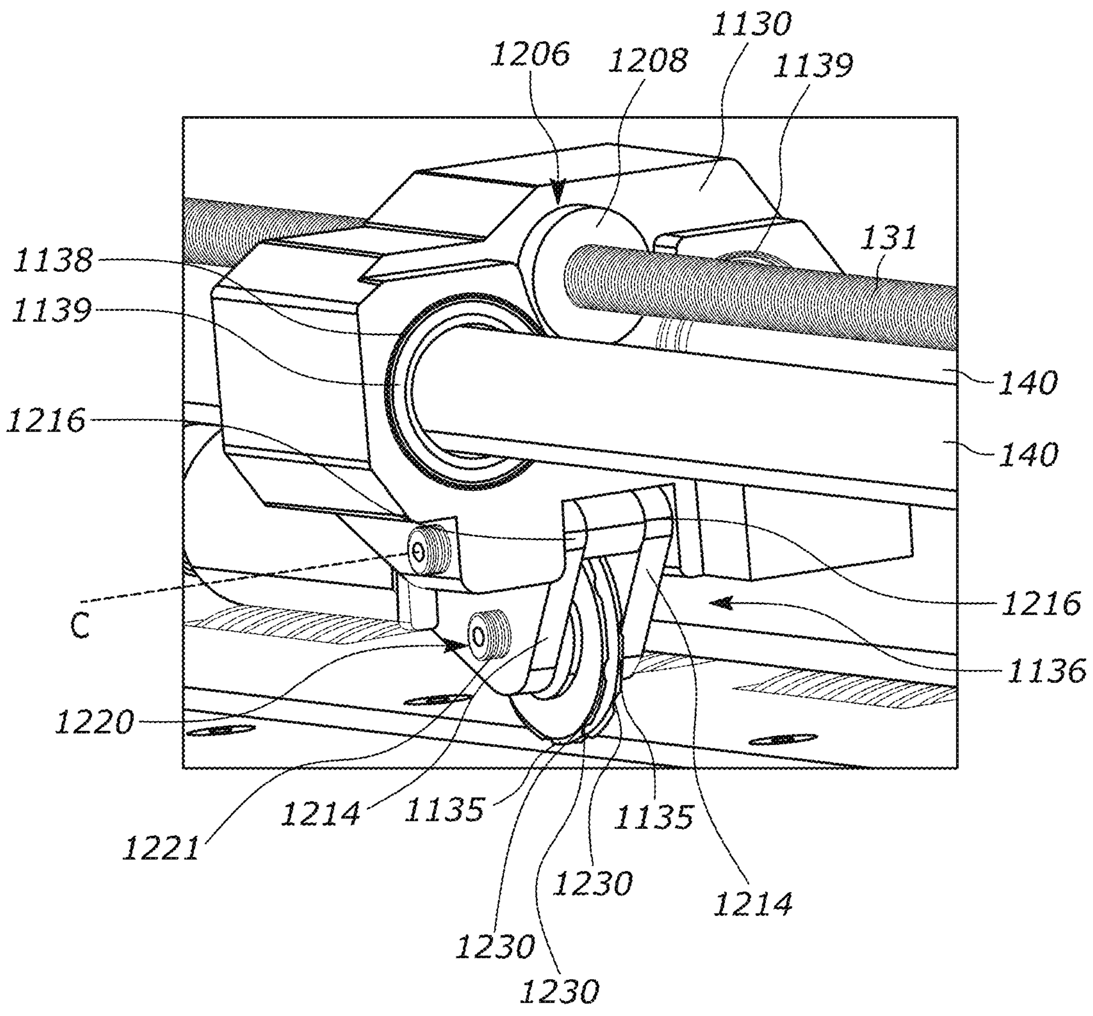
FIG. 10 is a perspective view of an alternative carriage including a lower mount holding two coaxial rotary blades that each include a plurality of notches about a circumference thereof.
Figure 11:
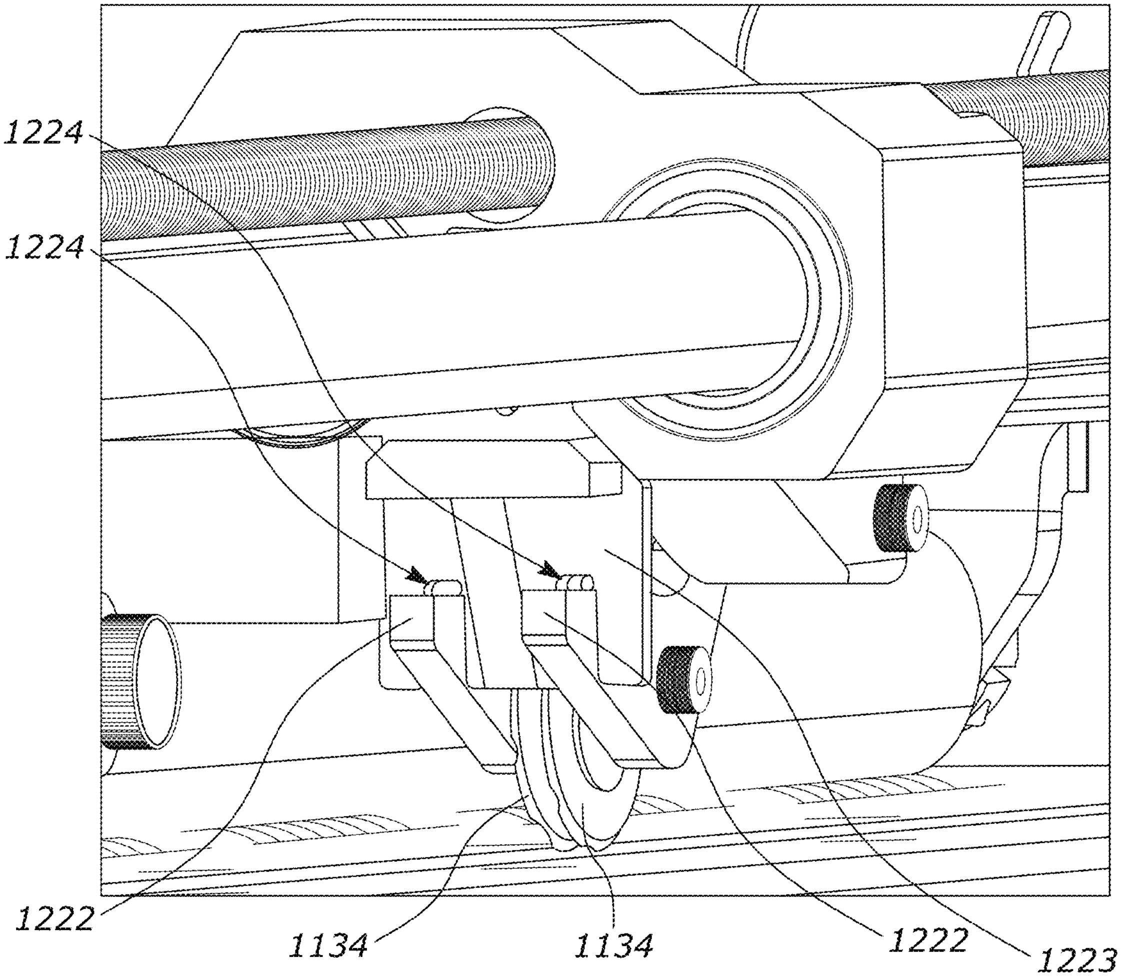
FIG. 11 is a rear perspective view of the alternative example carriage of FIG. 10 showing arms of the lower mount.

FIGS. 10 and 11 show an alternative embodiment of a carriage 1130. Similar to carriage 130, carriage 1130 includes guide apertures 1138 including a bushing 1139 that closely surrounds the support rails 140 and further includes a drive bore 1206 having an internally threaded bushing 1208 that is engaged with the threaded driveshaft 1131. As shown, the lower mount 1136 includes two arms 1214 parallel to and spaced from one another that are pivotably mounted to the carriage 1130. Each arm 1214 includes a first end portion 1216 that is pivotably mounted to the carriage 1130 via a pivot axis C, and a second end portion 1222 that extends at least partially in a forked bracket 1223 having guide slots 1224 that inhibit undesired movement of the arms 1214 in the machine direction M. A mount 1220 in the form of a shaft 1221 extends between the arms 1214 upon which one or more rotary blades 1134 are configured to be received. In some forms, a portion of the shaft 1221 on which the rotary blades 1134 are received may be keyed (not shown) and the rotary blades 1134 may include a corresponding keyed aperture (not shown) such that the rotary blades 1134 are configured to rotate integrally with the shaft 1221.

Similar to the carriage 130, the arms 1214 of the carriage 1130 may be loaded by a spring or other resilient component (not shown) such that the rotary blades 1134 are biased into engagement with the cutting plate 144. As illustrated, the rotary blades 1134 each include notches 1230 extending about a circumference thereof, and the notches 1230 of the two blades 1134 are circumferentially offset from one another. The blades 1134 may be held in this offset configuration by, for example, the keyed connection between the blades 1134 and the mounting shaft 1221 or via a keyed connection between the blades 1134 themselves. During a cutting operation, the cutting edge 1135 of each rotary blade 1134 is configured to cut slits or holes in packing material in the device 100 while the notched portions 1230 of the blades 1134 do not contact the material such that slits are not cut in the packing material by the notched portions 1230. So configured, as packing material is advanced into a cutting path of the carriage 1130, and the carriage 1130 is moved from one side of the internal chamber 112 to the other, the offset rotary blades 1134 are biased into engagement with the packing material via the loading thereof so as to cut two, adjacent rows of offset slits in the packing material.

Figure 12:
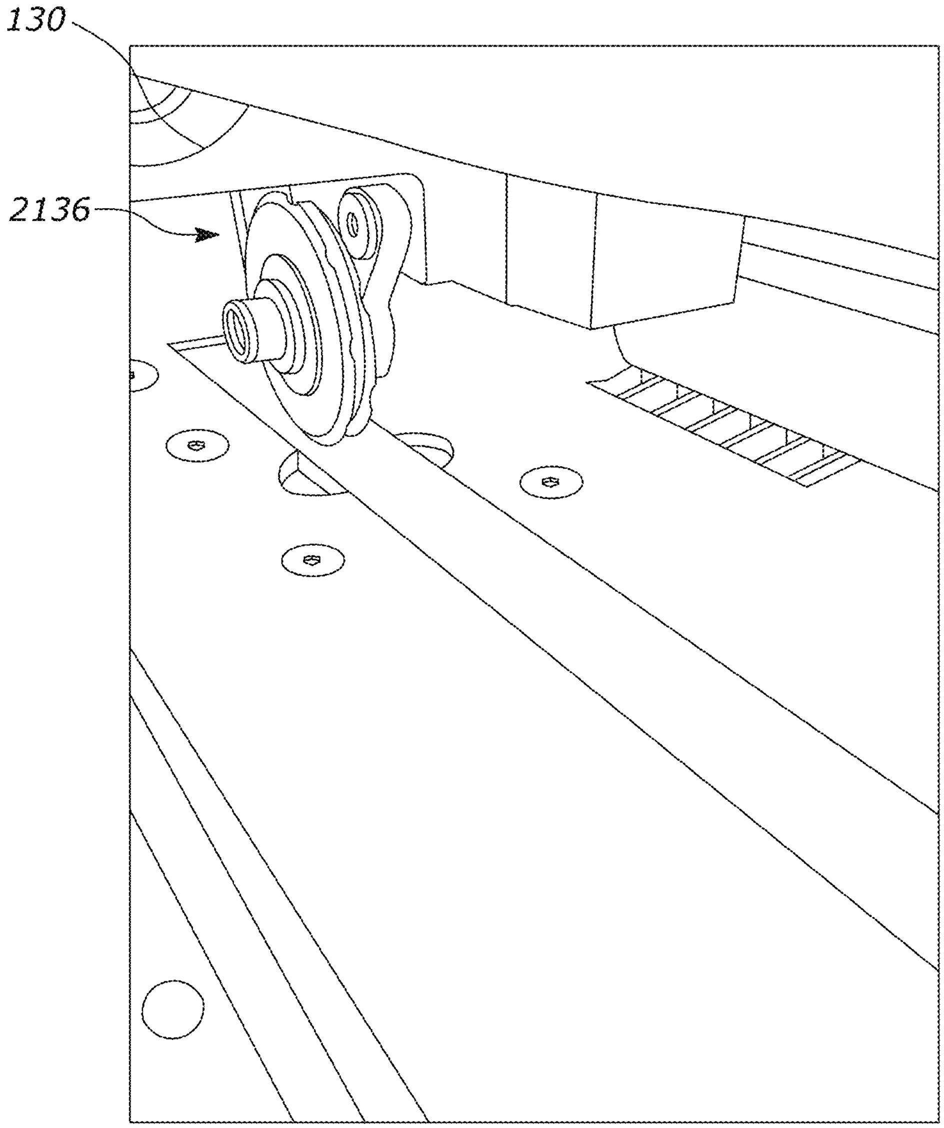
FIG. 12 is a perspective view of yet another example carriage including a lower mount holding two coaxial rotary blades that are biased into engagement with a hardened cutting plate of the lower portion of the housing.
Figure 13:
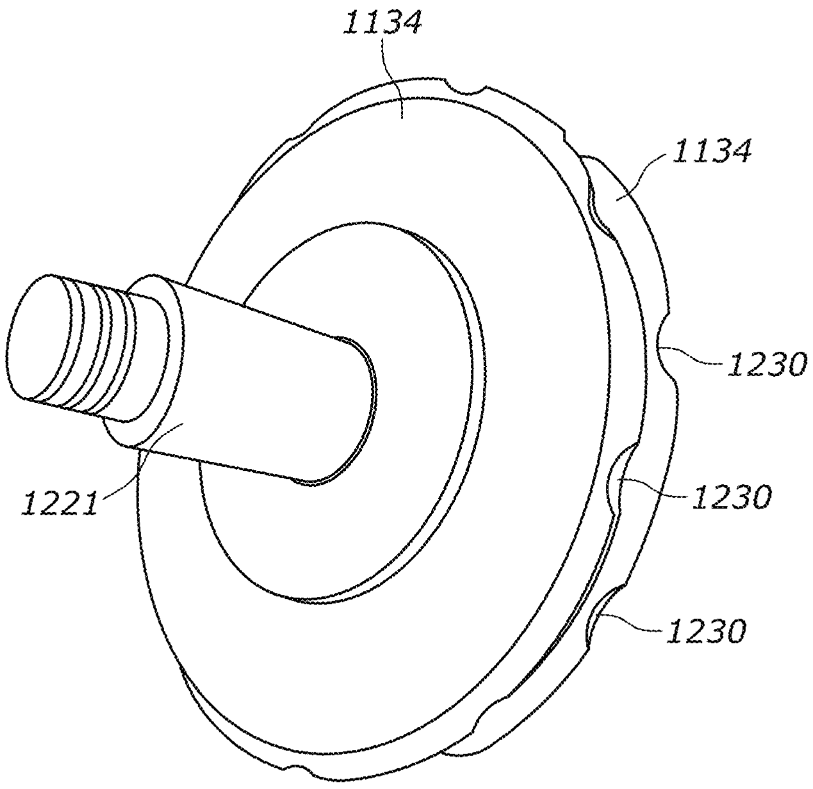
FIG. 13 is a perspective view of an example embodiment of a portion of the lower mount of the carriage including two coaxial rotary blades, each blade including a plurality of notches extending about a circumference thereof, the notches of one blade being circumferentially offset from the notches of the other.
Figure 14:
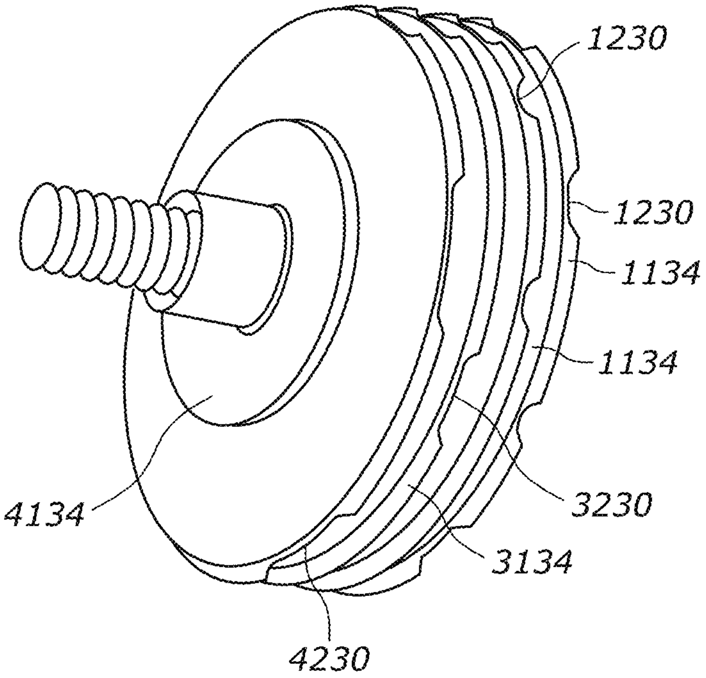
FIG. 14 is a perspective view of another example embodiment of a portion of the lower mount of the carriage including four coaxial rotary blades, each blade including a plurality of notches extending about a circumference thereof, the notches of various rotary blades being of different sizes.

FIG. 12 shows yet another alternative embodiment of a lower mount 2136 of the carriage 130 similar to FIGS. 8 and 9 with arm 214 but including two adjacent blades similar to FIGS. 10 and 11. It should be understood that the lower mounts provided herein may be configured to accommodate any number of blades for use in desired cutting operations, and that such lower mounts may be interchangeable with different embodiments of carriages to provide variable cutting patterns. FIG. 13 shows the example shaft 1221 of mounting portion 1136 including the two rotary blades 1134 having circumferentially offset notches 1230 along cutting edges thereof. In another example, FIG. 14 shows an example shaft of a mounting portion including four rotary blades, including rotary blades 1134, a rotary blade 3134, and a rotary blade 4134 having different notched configurations to provide different slit patterns in the packing material. As shown, rotary blade 4134 includes larger notches 4230 that would provide a larger space between adjacent slits cut in the packing material, rotary blade 3134 includes slightly smaller notches 3230 that would provide a smaller space between adjacent slits cut in the packing material, and rotary blades 1134 include still smaller notches 1230. It should be understood that rotary blades of different types may be selected and arranged in series and/or in parallel as desired by a user for variable cutting and/or slitting patterns and that such blades may be the same as one another or may be different. In some embodiments, rotary blades may be selected that are configured to score the material so as to create one or more lines of perforation if desired as opposed to cutting the packing material.

Figure 15:
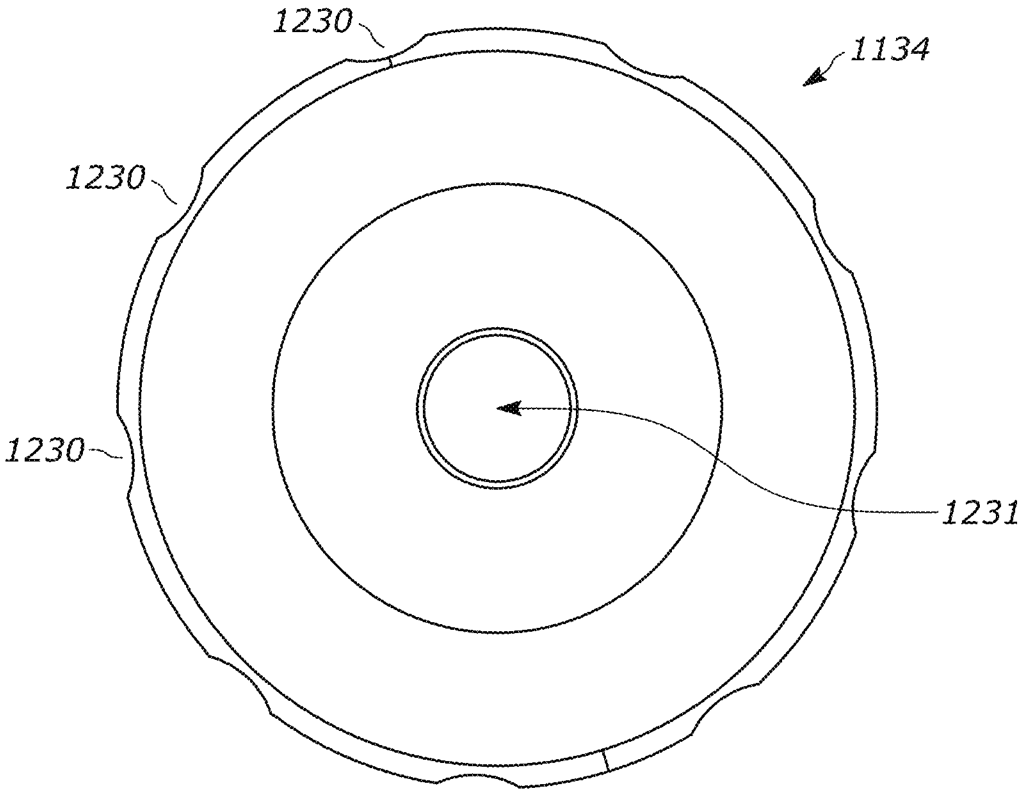
FIG. 15 is a plan view of an example rotary blade showing a plurality of notches extending about a circumference thereof.

An example rotary blade 1134 including notches 1230 is further shown in the plan view of FIG. 15. The rotary blade 1134 includes a central aperture 1231 that is configured to be received over, e.g., a shaft of the mounting portion of the carriage. Although the rotary blade 1134 as illustrated includes nine notches 1230 equally spaced around the circumference thereof, it should be understood that more or less notches may be formed therein.

Figure 16:
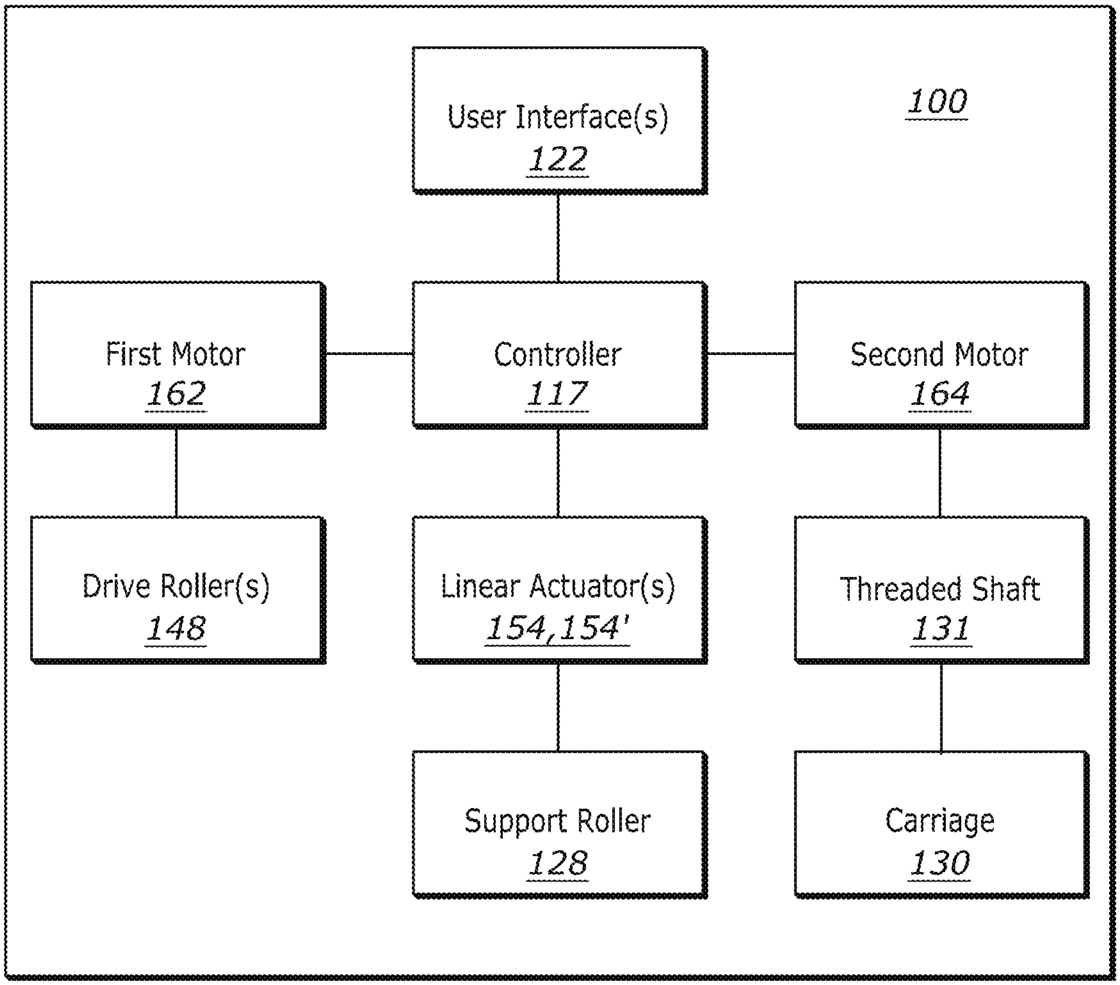
FIG. 16 is a schematic diagram of various elements of an example device for producing slit sheet packing material.

FIG. 16 illustrates a schematic diagram of the device 100 including the user interface 122 and the controller 117. In some forms, the controller 117 may include an Arduino or an embedded chip, or in other forms may be formed as a printed circuit board (PCB) having one or more circuits printed thereon for controlling various aspects of the motors and the user interface. As explained in further detail above, the controller 117 is coupled to the first motor 162 such that the controller 117 may cause rotation of the driveshaft 160 and one or more drive rollers 148 and is further coupled to the second motor 164 such that the controller 117 may cause rotation of the threaded driveshaft 131 to move the carriage 130 coupled thereto along the track 132. In addition, the controller 117 is operably coupled to the linear actuators 154, 154' to move the support roller 128 between the engagement and disengagement positions for loading of packing material.

Figure 17:
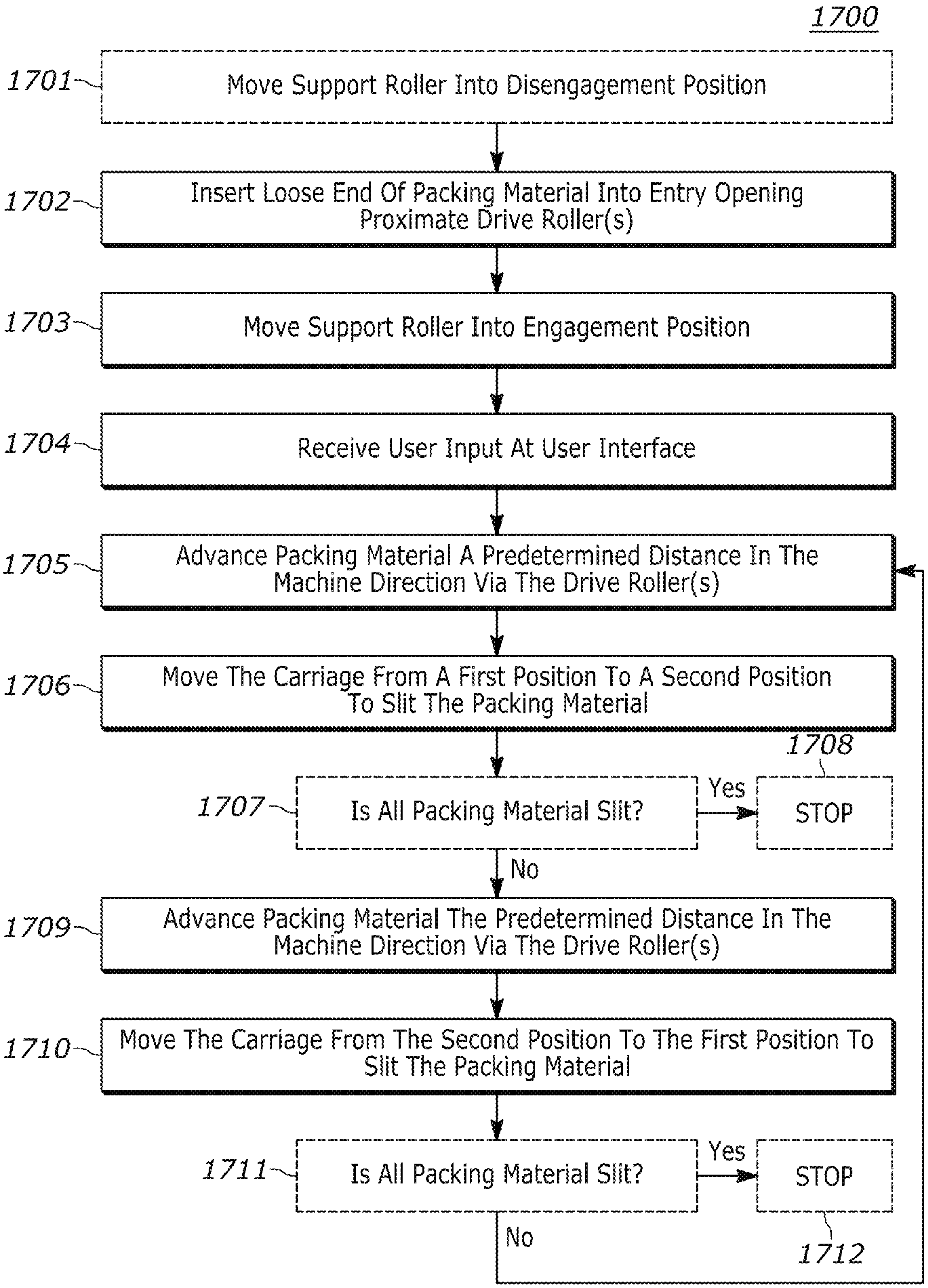
FIG. 17 shows an example method for forming slit sheet packing material.

FIG. 17 shows an example method 1700 of forming slit sheet packing material using the device 100 using one or more notched rotary blades, such as rotary blades 1134. At step 1701, the user may optionally move the support roller 128 into the disengagement position, but this step may not be needed if the support roller 128 is already in said disengagement position. In step 1702, the user may then insert a loose end of packing material (e.g., a loose end of a roll of kraft paper, foam, or other packing material) into the entry opening 104 proximate the one or more drive rollers 148. Once the packing material is positioned so as to be at least partially superimposed over the drive rollers 148, the support roller 128 is pivoted into the engagement position in step 1703 (e.g., by using the loading button 126) to sandwich the packing material between the support roller 128 and the drive rollers 148. In some forms, the user may initiate steps 1701, 1702, and 1703 via various inputs through the user interface, but alternatively, the device 100 may be configured to automatically load the packing material in anticipation of a slitting operation.

Upon receiving a user input at the user interface 122 indicating that the user desires to initiate a slitting operation at step 1704, the controller 117 of the device 100 may cause rotation of the drive rollers 148 via the first motor 162 to advance the packing material a predetermined distance in the machine direction M in step 1705. The predetermined distance may be determined, for example, based on a desired length between the rows of slits cut in the packing material via the rotary blades and may also be determined based on the number of rotary blades installed on the carriage 130 or the spacing between the rotary blades if multiple blades are attached. This distance may be preprogrammed into the controller 117 or may be adjusted by the user via the user interface 122 as desired.

In step 1706, once the packing material has been advanced the predetermined distance, the controller 117 is configured to cause operation of the second motor 164 to cause corresponding rotation of the threaded driveshaft 131 in the clockwise direction to drive the carriage 130 from a first position A on the track 132 proximate a first side of the packing material to a second position B on the track 132 proximate a second side of the packing material. As the carriage 130 is moved from the first position to the second position, the loaded rotary blades are biased into engagement with the cutting plate 144 and are configured to cut slits into the packing material while the carriage 130 is in motion.

In step 1707, the method may optionally include determining whether all of the packing material is finished being cut or slit before continuing. This may be determined, for example, using a sensor (not shown) operatively coupled to the controller 117 to detect whether any more packing material remains. For example, the sensor may be an optical sensor or the like. In addition, a user may be permitted to stop the process at any time using emergency stop button 124. If the controller 117 determines that all packing material has been cut, the device 100 may be stopped at step 1708. However, if the controller 117 determines that not all packing material has been cut, in step 1709, the controller 117 may cause rotation of the one or more drive rollers 148 via the first motor 162 to again advance the packing material the predetermined distance in the machine direction M.

Then, in step 1710, the controller 117 is configured to cause operation of the second motor 164 once again to cause corresponding rotation of the threaded driveshaft 131 in the counter-clockwise direction to drive the carriage 130 from the second position B on the track 132 proximate the second side of the packing material to the first position A on the track 132 proximate the first side of the packing material. As the carriage 130 is moved from the second position to the first position, the loaded rotary blades are biased into engagement with the cutting plate 144 and are configured to cut slits into the packing material while the carriage 130 is in motion. In step 1711, the method 1700 may optionally again determine if all of the packing material has been cut, and if not, may return to step 1705 in a loop until all material has been cut or the user decides to stop the device 100. So configured, the controller 117 of the device 100 may alternately control the first and second motors 162, 164 so as to intermittently feed the packing material in the machine direction M and cut slits in the packing material between such feeding.

In some embodiments, the controller 117 may be configured to cause the carriage 130 to move less than an entire distance along the track 132, such as if the user only desires to cut slits in a portion of the width of the packing material. The user may specify the start and stop points of the carriage 130 along the track 132 during a cutting operation via the user interface 122.

Figure 18:
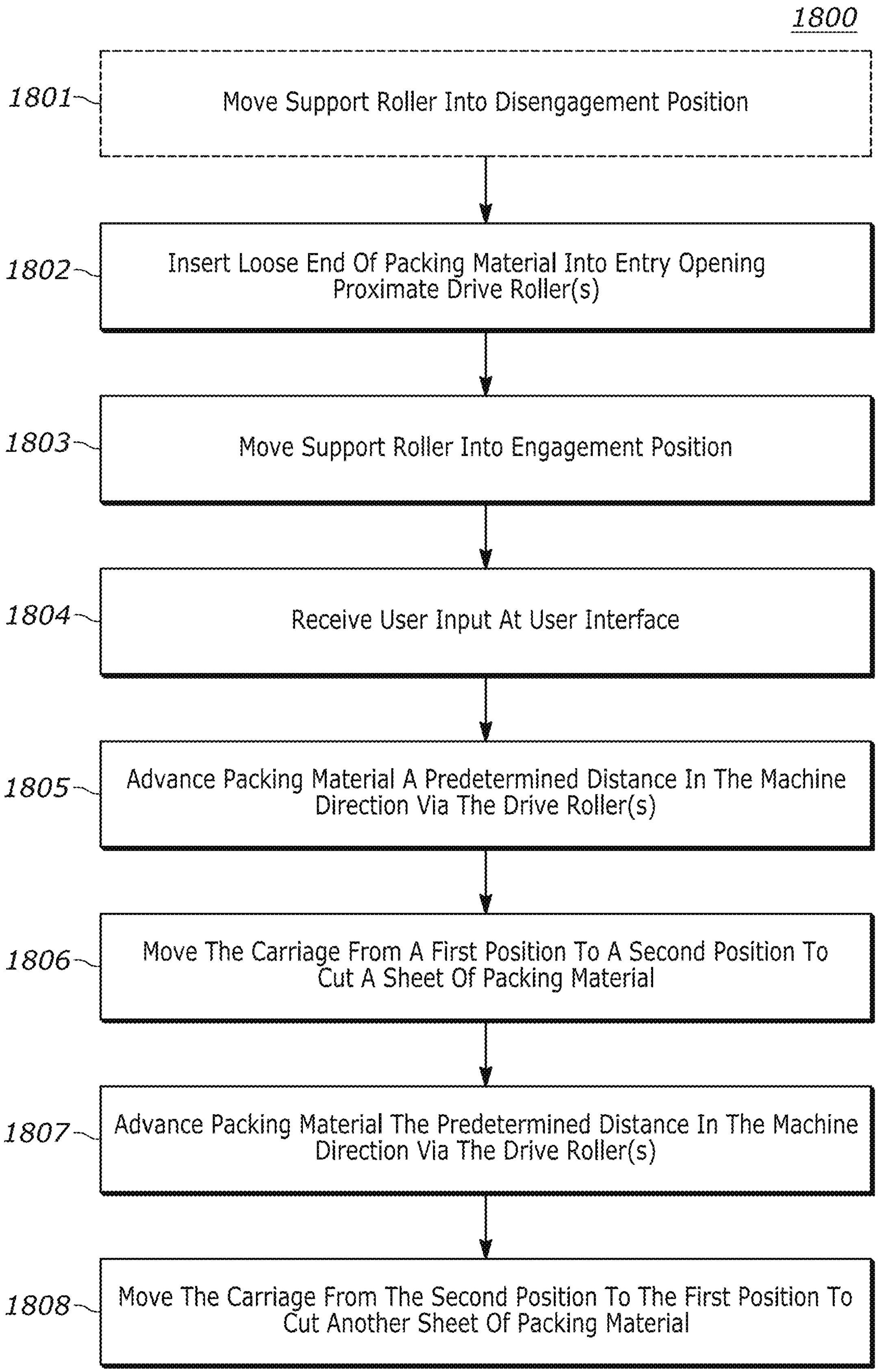
FIG. 18 shows an example method for sheeting packing material.

FIG. 18 shows an example method 1800 of using the device 100 of sheeting packing material using the device 100 using one or more rotary blades, such as rotary blade 134. At step 1801, the user may optionally move the support roller 128 into the disengagement position, but this step may not be needed if the support roller 128 is already in said disengagement position. In step 1802, the user may then insert a loose end of packing material (e.g., a loose end of a roll of kraft paper, foam, or other packing material) into the entry opening 104 proximate the one or more drive rollers 148. Once the packing material is positioned so as to be at least partially superimposed over the drive rollers 148, the support roller 128 is pivoted into the engagement position in step 1803 to sandwich the packing material between the support roller 128 and the drive rollers 148. In some forms, the user may initiate steps 1801, 1802, and 1803 via various inputs through the user interface, but alternatively, the device 100 may be configured to automatically load the packing material in anticipation of a sheeting operation.

At step 1804, upon receiving a user input at the user interface 122 indicating that the user desires to initiate a sheeting operation, the controller 117 of the device 100 may cause rotation of the drive rollers 148 via the first motor 162 to advance the packing material a predetermined distance in the machine direction M in step 1805. The predetermined distance may be determined, for example, based on a desired sheet size of the packing material to be sheeted. This distance may be preprogrammed into the controller 117 or may be selected by the user via the user interface 122 as desired.

In step 1806, once the packing material has been advanced the predetermined distance, the controller 117 is configured to cause operation of the second motor 164 to cause corresponding rotation of the threaded driveshaft 131 in the clockwise direction in step 1706 to drive the carriage 130 from a first position A on the track 132 proximate a first side of the packing material to a second position B on the track 132 proximate a second side of the packing material. As the carriage 130 is moved from the first position A to the second position B, the one or more loaded rotary blades are biased into engagement with the cutting plate 144 and are configured to cut through the packing material while the carriage 130 is in motion so as to cut a sheet of the packing material.

The process may stop after sheeting one sheet of packing material. However, if additional sheets of packing material are desired, in step 1807, the controller 117 is configured to cause operation of the first motor 162 to again advance the packing material a predetermined distance in the machine direction M. Then, in step 1808, the controller 117 is configured to cause operation of the second motor 164 once again to cause corresponding rotation of the threaded driveshaft 131 in the counter-clockwise direction to drive the carriage 130 from the second position B on the track 132 proximate the second side of the packing material to the first position A on the track 132 proximate the first side of the packing material. As the carriage 130 is moved from the second position B to the first position A, the one or more loaded rotary blades are biased into engagement with the cutting plate 144 and are configured to cut through the packing material while the carriage 130 is in motion. If still more sheets are desired, the method may repeat steps 1805 through 1808 in a loop as desired.

Figure 19:
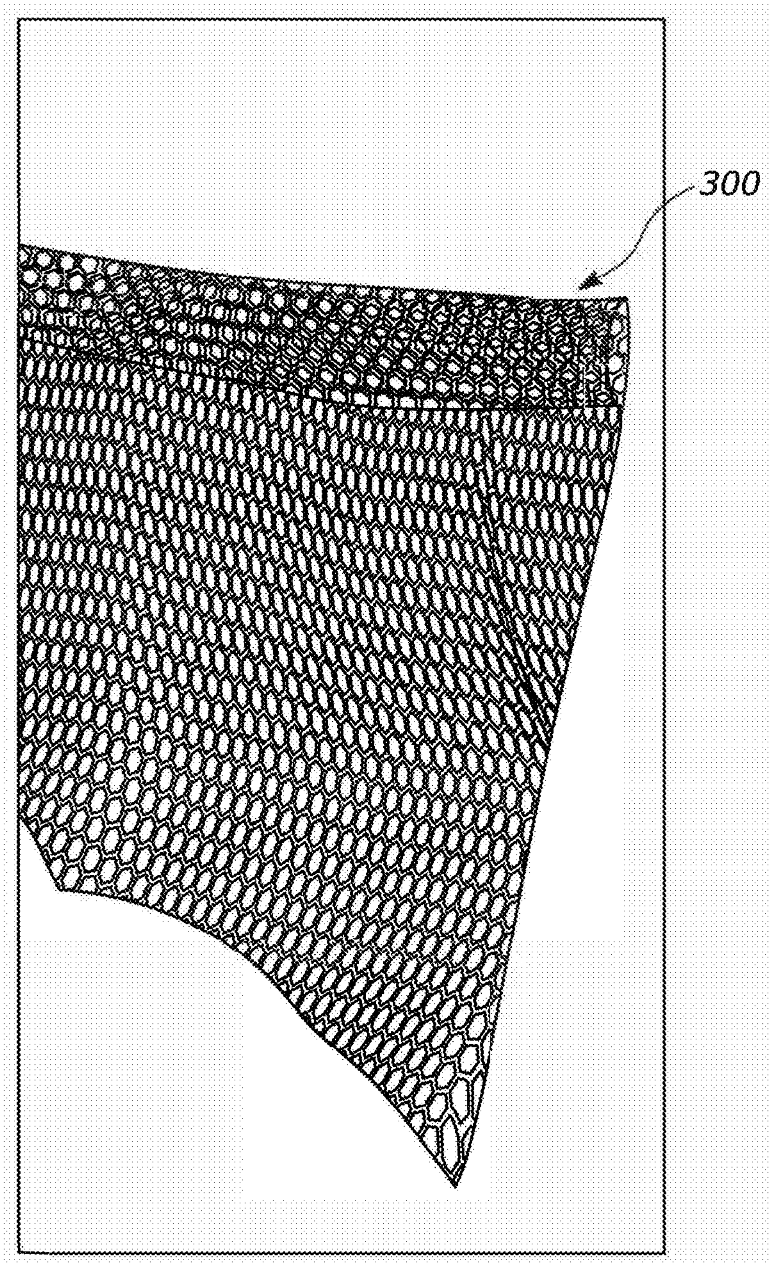
FIG. 19 is a perspective view showing an example of slit sheet packing material in the form of kraft paper manufactured using the example device of FIG. 1.
Figure 20:
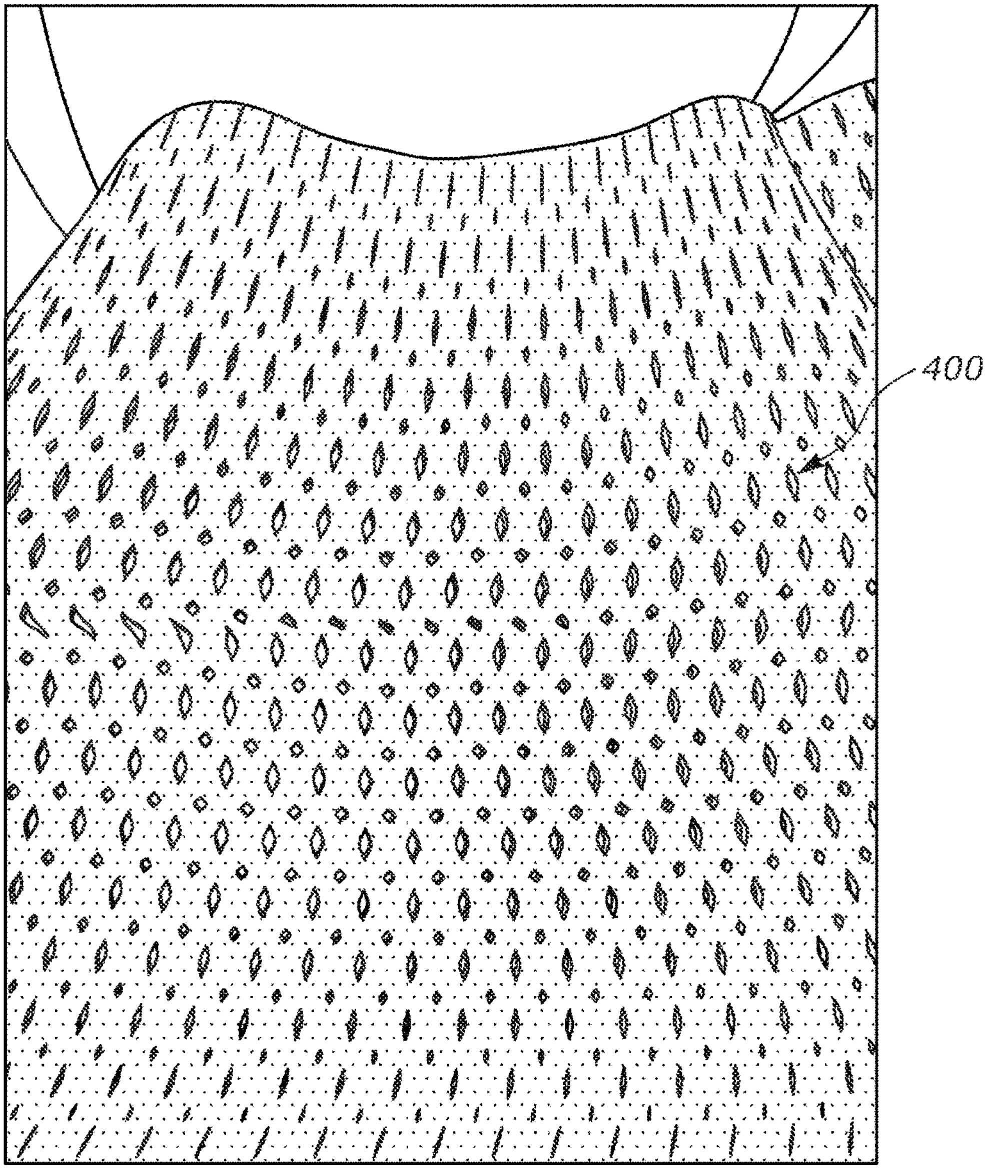
FIG. 20 is a perspective view showing an example of slit sheet packing material in the form of a foam sheet manufactured using the example device of FIG. 1.

FIG. 19 shows an example length of packing material 300 in the form of kraft paper after being advanced through the device and slit via the rotary blades via, for example, the method described with respect to FIG. 17. As shown, the sheet of packing material has a plurality of spaced parallel rows of individual slits that are offset from one another. As shown, the slits are essentially straight lines cut in the packing material by the rotary blades and may be at a length corresponding with the space between adjacent notches of the rotary blade. The rows extend transversely from one end of the packing material to the opposing end of the packing material, and each of the rows is provided with interval spaces between consecutive slots provided by the notches of the rotary blades. Each of the rows is provided with interval spaces between consecutive slits. As illustrated, the slits are arranged in a consistent, uniformly repeating pattern, but may be varied depending on the number and type of rotary blades attached to the carriage (e.g., the number of notches, size of the notches, etc.). When the packing material is pulled on and expanded by a user, the slit pattern produces a generally hexagonal cell pattern that may beneficially be used as a void filling material for packaging applications. For example, when the filling material is wrapped around an article, a plurality of layers of interlocked expanded sheets may contact one another due to the hexagonal configuration of adjacent layers of the packing material such that the layers nest and interlock with one another to fill space. FIG. 20 shows another example length of packing material 400 in the form of a foam sheet after being advanced through the device and slit via the rotary blades. Similar to the kraft paper shown in FIG. 19, the foam sheet has a plurality of spaced parallel rows of individual slits that are offset from one another.

Figure 21:
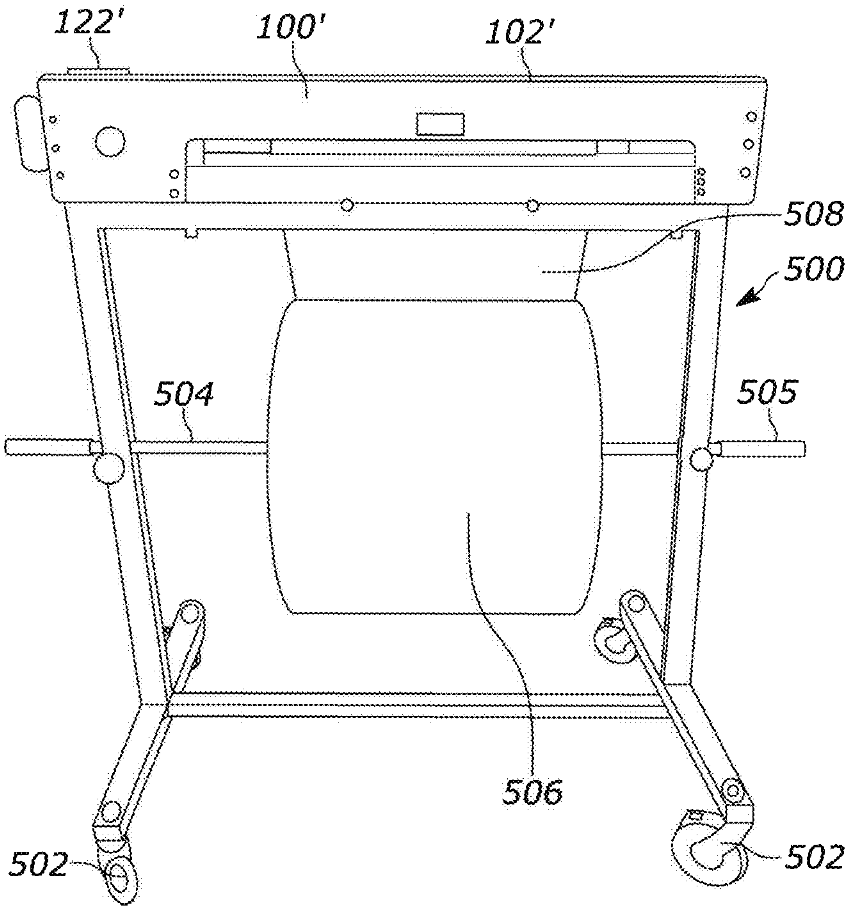
FIG. 21 is a perspective view of a support frame for an example device for forming slit sheet packing material.

FIG. 21 shows an alternative embodiment of a device 100' similar to device 100 such that any differences will be described hereinafter. As shown, the positioning of the user interface 122' and various buttons are different on the housing 102', but the internal components are the same as device 100. As illustrated, the device 100' (or device 100) is configured to be mounted to a support frame 500 having a plurality of swivel, caster wheels 502. The support frame 500 includes a horizontal support arm 504 having a handle 505 for loading and supporting a rotatable roll 506 of packing material 508 thereon. So configured, a loose end of the packing material 508 may be loaded into the device 100' in the manner described above and the device 100' may be operated to continuously sheet or slit the packing material 508 from the roll as the drive rollers continue to feed it. In some embodiments, the support frame 500 may include an additional support arm on an opposite side thereof for loading and supporting an empty roll for winding packing material such that packing material may be unwound from the roll 506, fed through the device 100' and slit, cut, or scored, and may be re-wound onto the empty roll for subsequent storage. In alternative forms, as shown in FIGS. 1 and 2, the device 100' may be removed from the support frame 500 and may be placed on another surface, such as a table.

It should also be understood that while certain features have been described with respect to certain embodiments, these features may be intermixed or interchanged with one another to form other embodiments as desired. All features disclosed herein are intended to be used in any of the embodiments disclosed herein either in lieu of similar features or in combination with other features. Uses of singular terms such as "a," and "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass only A, only B, or both A and B.

This detailed description refers to specific examples in the drawings and illustrations. These examples are described in sufficient detail to enable those skilled in the art to practice the embodiments set forth in the present disclosure. These examples also serve to illustrate how the disclosed subject matter can be applied to various purposes or embodiments. Other embodiments are included within the disclosed subject matter, as logical, mechanical, electrical, and other changes can be made to the example embodiments described herein. Features of various embodiments described herein, however essential to the example embodiments in which they are incorporated, do not limit the disclosed subject matter as a whole, and any reference its elements, operation, and application are not limiting as a whole, but serve only to define these example embodiments. This detailed description does not, therefore, limit embodiments of the disclosure, which are defined only by the appended claims. Each of the embodiments described herein are contemplated as falling within the disclosed subject matter, which is set forth in the following claims.

Those skilled in the art will recognize that a wide variety of modifications, alterations, and combinations can be made with respect to the above described embodiments without departing from the scope of the invention. For instance, the various aspects of the illustrated devices, such as the mounting portions of the carriages having various combinations of rotary blades, can be implemented individually or together in any combination. Such modifications, alterations, and combinations are to be viewed as being within the ambit of the present disclosure.

What is claimed is:

1. A device for producing slit-sheet packing material, the device comprising:

a housing having an entry opening and an exit opening;

a user interface configured to receive a user input;

a motor;

a controller operably coupled to the user interface and the motor; a carriage positioned in the housing, the carriage being engaged with and configured to move along a track between a first position and a second position, the carriage including a lower mount including a first rotary blade having one or more notches spaced about a circumference thereof;

a second motor operably coupled to the controller; and a drive roller operably coupled to the second motor and positioned proximate the entry opening of the housing, the drive roller configured to feed packing material from the entry opening to the exit opening;

wherein in response to receiving the user input at the user interface, the controller is configured to cause the motor to facilitate movement of the carriage between the first and second positions.

2. The device of claim 1, wherein the lower mount further includes a second rotary blade having one or more notches spaced about a circumference thereof, the second rotary blade coaxial with the first rotary blade.

3. The device of claim 2, wherein the one or more notches of the second rotary blade are circumferentially offset from the one or more notches of the first rotary blade.

4. The device of claim 2, wherein the one or more notches of the first rotary blade are a different size than the one or more notches of the second rotary blade.

5. The device of claim 2, further comprising a third rotary blade coaxial with and adjacent to the first and second rotary blades.

6. The device of claim 1, wherein the carriage is coupled to and configured to be driven between the first and second positions by a threaded driveshaft operably coupled to the motor.

7. The device of claim 1, wherein the track includes a support rail extending through a guide aperture of the carriage to facilitate movement of the carriage between the first and second positions.

8. The device of claim 1, wherein the controller is configured to alternate operation of the motor and the second motor.

9. The device of claim 1, further comprising a support roller configured to move between a disengagement position wherein the support roller is pivoted away from the drive roller and an engagement position wherein the support roller is positioned proximate the drive roller.

10. The device of claim 9, further comprising a linear actuator operably coupled to the support roller to pivot the support roller between the disengagement position and the engagement position.

11. The device of claim 1, wherein the housing is mounted on a support frame, the support frame including a support arm configured to receive a roll of packing material.

12. The device of claim 1, wherein a lower portion of the housing includes a cutting plate configured to be contacted by the first rotary blade as the carriage is moved between the first and second positions.

13. A method of producing slit-sheet packing material, the method comprising using the device of claim 1, to produce the slit-sheet packing material.

* * * * *